United States Patent
Parackal Saby et al.

(10) Patent No.: US 12,476,987 B2
(45) Date of Patent: Nov. 18, 2025

(54) DATACENTER SECURE CONTROL MODULE (DC-SCM) AS-A-SERVICE SYSTEM

(71) Applicant: Dell Products L.P., Round Rock, TX (US)

(72) Inventors: Vinod Parackal Saby, Bangalore (IN); Raghavendra Venkataramudu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/489,145

(22) Filed: Oct. 18, 2023

(65) Prior Publication Data
US 2025/0133092 A1 Apr. 24, 2025

(51) Int. Cl.
*H04L 9/40* (2022.01)
(52) U.S. Cl.
CPC ................ *H04L 63/1416* (2013.01)
(58) Field of Classification Search
CPC .................................................. H04L 63/1416
See application file for complete search history.

(56) References Cited

U.S. PATENT DOCUMENTS

| | | | |
|---|---|---|---|
| 2024/0297901 A1* | 9/2024 | Paulraj | H04L 63/20 |
| 2024/0303339 A1* | 9/2024 | Paulraj | H04L 9/0643 |
| 2024/0305633 A1* | 9/2024 | Paulraj | H04L 63/0876 |
| 2024/0311469 A1* | 9/2024 | Cho | G06F 21/57 |
| 2025/0062891 A1* | 2/2025 | Cho | H04L 9/0825 |
| 2025/0130813 A1* | 4/2025 | Venkataramudu | G06F 9/4403 |

* cited by examiner

*Primary Examiner* — Oleg Korsak
(74) *Attorney, Agent, or Firm* — Joseph Mencher

(57) ABSTRACT

A DataCenter Secure Control Module (DC-SCM) as-a-service system includes a DataCenter Modular Hardware System (DC-MHS) computing device having a Host Processor Module (HPM) and a networking device that is coupled to the HPM and a network, and a DC-SCM provisioning system that is coupled to the networking device via the network. The DC-SCM provisioning system provides a networking device service instance for the networking device, receives a networking device DC-SCM functionality configuration for the networking device through the network via the networking device service instance, and configures at least one image to provide networking device DC-SCM functionality defined by the networking device DC-SCM functionality configuration. The networking device receives the at least one image via the network, and executes the at least one image to perform the networking device DC-SCM functionality with the HPM.

20 Claims, 19 Drawing Sheets

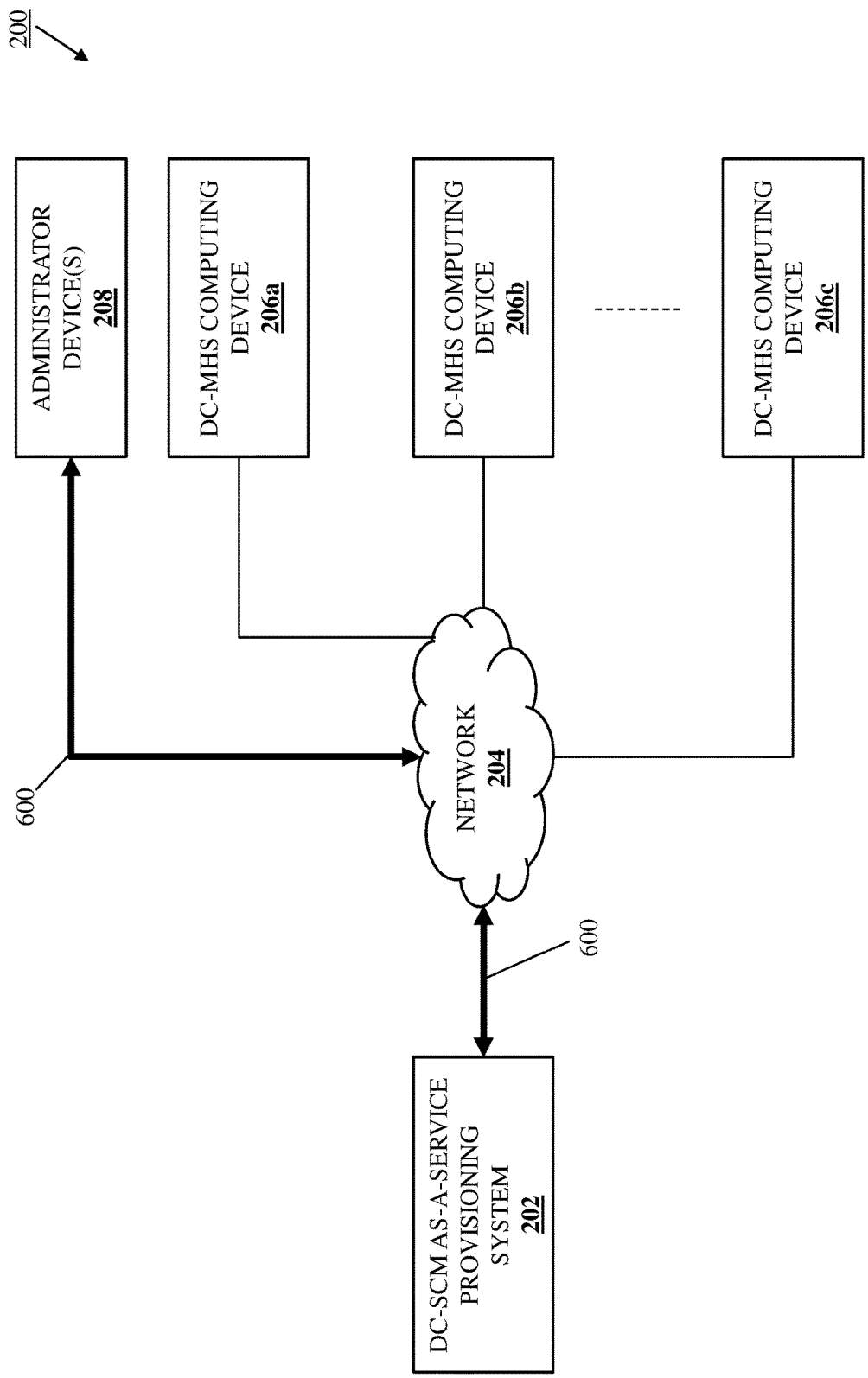

DATACENTER SECURE CONTROL MODULE (DC-SCM) AS-A-SERVICE SYSTEM

BACKGROUND

The present disclosure relates generally to information handling systems, and more particularly to providing DataCenter Secure Control Module (DC-SCM) functionality "as a service" in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and other computing devices known in the art may be provided in configurations promulgated by the Open Compute Project (OCP) according to the DataCenter Modular Hardware System (DC-MHS) sub-project (referred to as "DC-MHS" configurations below). As will be appreciated by one of skill in the art in possession of the present disclosure, the DC-MHS sub-project attempts to standardize a collection of Host Processor Module (HPM) form-factors and corresponding components (e.g., Add-In Cards (AICs)) to allow interoperability of those HPMs with computing devices and other platforms. Such DC-MHS configurations require a DataCenter Secure Control Module (DC-SCM) that performs conventional Basic Input/Output System (BIOS) and Baseboard Management Controller (BMC) functionality to provide initialization, management, security and control functionality for the DC-MHS computing device via the DC-SCM rather than via a conventional BIOS and BMC device included on a conventional motherboard. However, the requirement to include a DC-SCM in computing devices with DC-MHS configurations raises some issues, as the DC-SCM is a relatively expensive component that the inventors have discovered is not necessary in some computing devices.

Accordingly, it would be desirable to provide computing devices with DC-MHS configurations while addressing the issues discussed above.

SUMMARY

According to one embodiment, an Information Handling System (IHS) includes a chassis; a Host Processor Module (HPM) that is housed in the chassis; and a networking device that is housed in the chassis, that is coupled to the HPM, and that is coupled to a network, wherein the networking device includes: a networking device processing system that is coupled to the network; and a networking device memory system that is coupled to the networking device processing system and that includes instructions that, when executed by the networking device processing system, cause the networking device processing system to provide a DataCenter Secure Control Module (DC-SCM) engine that is configured to: receive, from a DC-SCM provisioning system via the network, at least one image that is configured to provide networking device DC-SCM functionality; and execute the at least one image to perform the networking device DC-SCM functionality with the HPM.

BRIEF DESCRIPTION OF THE DRAWINGS

FIG. 6A is a schematic view illustrating an embodiment of the DC-SCM as-a-service system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
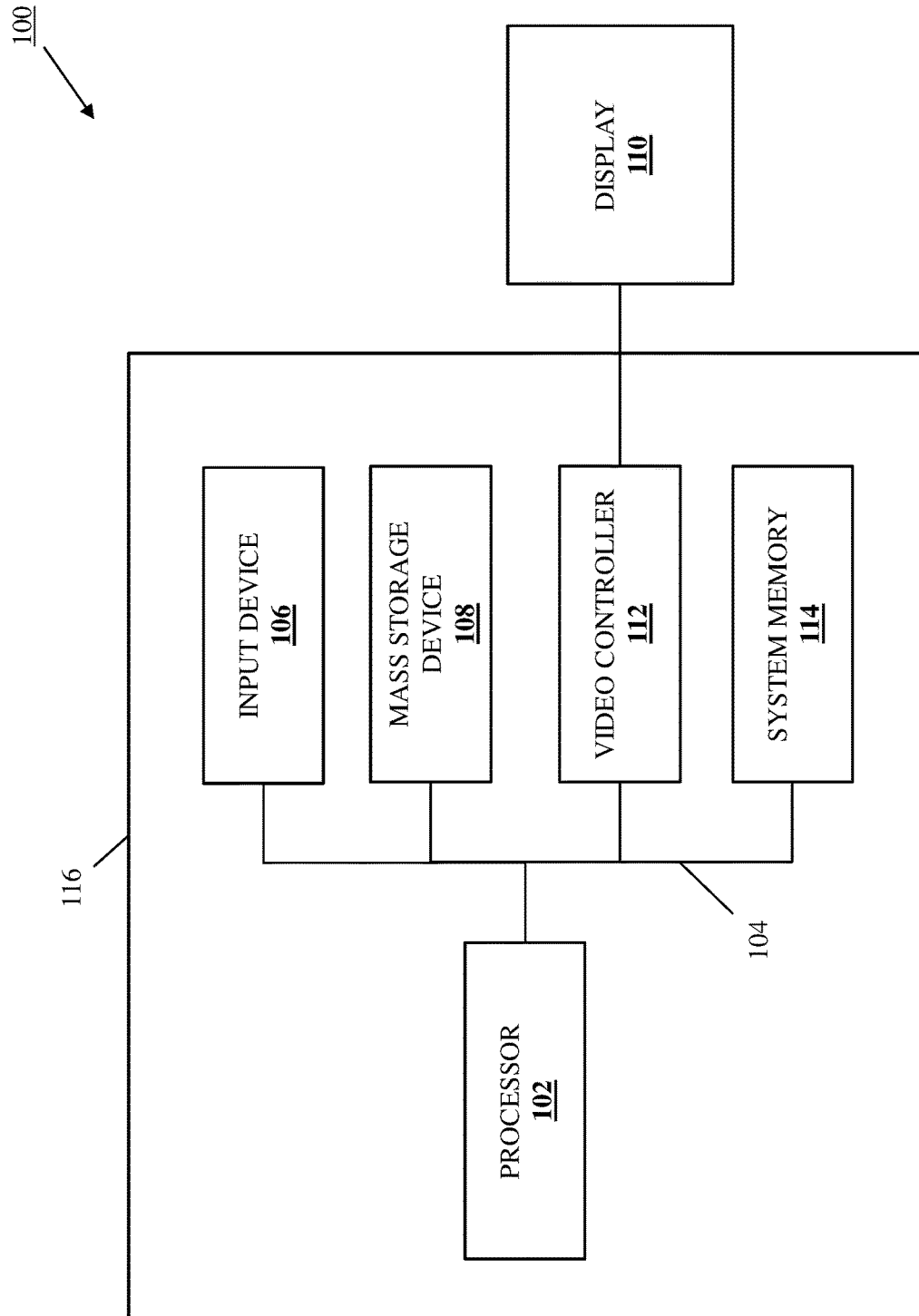
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
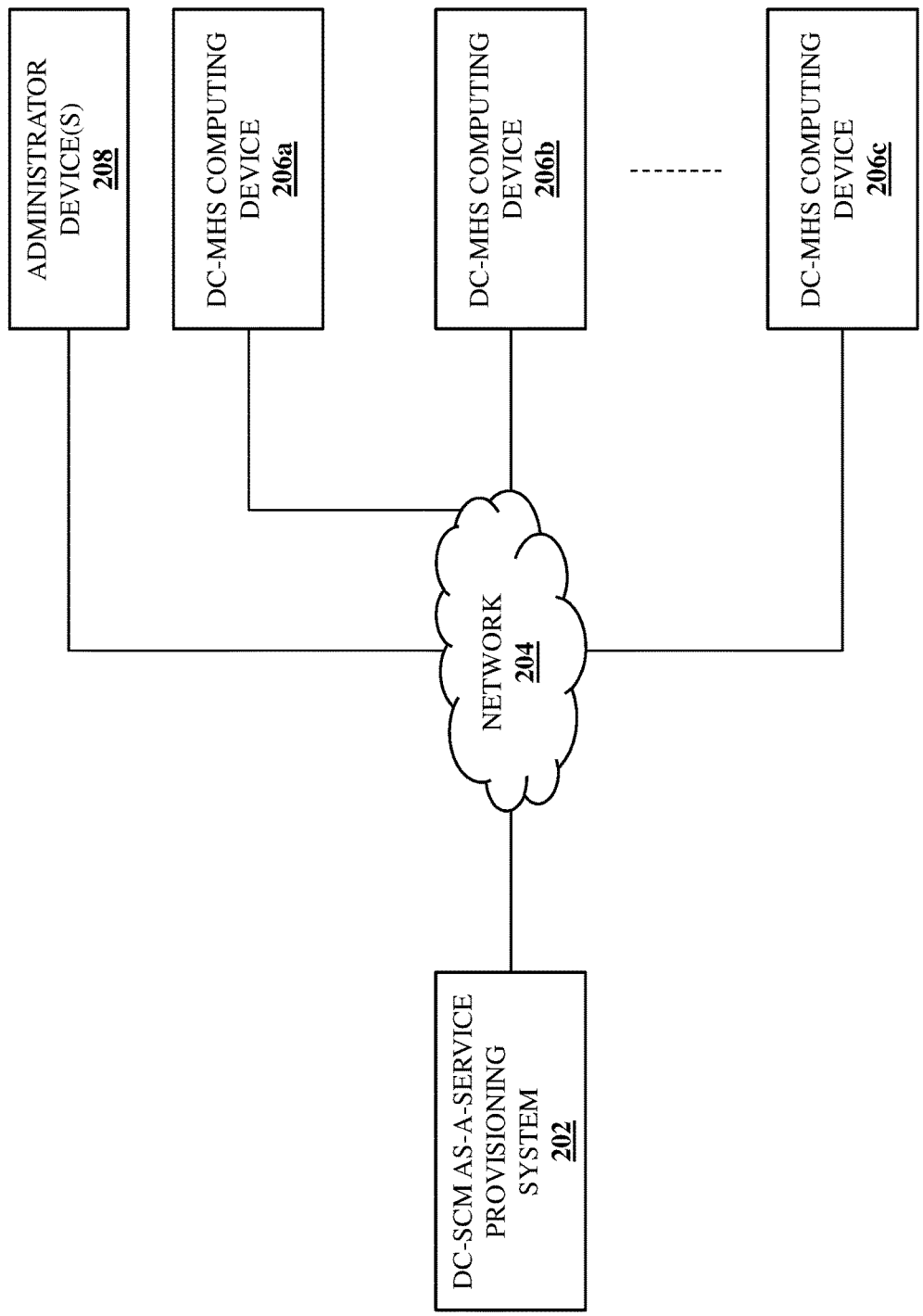
FIG. 2 is a schematic view illustrating an embodiment of a DC-SCM as-a-service system that may be provided according to the teachings of the present disclosure.

Referring now to FIG. 2, an embodiment of a DataCenter Secure Control Module (DC-SCM) as-a-service system 200 is illustrated that may be provided according to the teachings of the present disclosure. In the illustrated embodiment, the DC-SCM as-a-service system 200 includes a DC-SCM as-a-service provisioning system 202. In an embodiment, the DC-SCM as-a-service provisioning system 202 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that DC-SCM as-a-service provisioning systems provided in the DC-SCM as-a-service system 200 may include any systems and/or device(s) that may be configured to operate similarly as the DC-SCM as-a-service provisioning system 202 discussed below.

In specific examples, some embodiments of the present disclosure configure the DC-SCM as-a-service provisioning system 202 to provide a "cloud-based" DC-SCM "as-a-service" (DC-SCMaaS) portal for which users may pay (e.g., a provider of the DC-SCM as-a-service provisioning system 202) to access and enable DC-SCM functionality on computing devices that do not include a DC-SCM, although one of skill in the art in possession of the present disclosure will appreciate how the functionality discussed below may be provided in other implementations while remaining within the scope of the present disclosure as well.

In the illustrated embodiment, the DC-SCM as-a-service system 200 is coupled to a network 204 that may be provided by a Local Area Network (LAN), the Internet, combinations thereof, and/or any other networks that would be apparent to one of skill in the art in possession of the present disclosure. In the illustrated embodiment, a plurality of DataCenter Modular Hardware System (DC-MHS) computing devices 206a, 206b, and up to 206c are coupled to the DC-SCM as-a-service provisioning system 202 via the network 204. In an embodiment, each of the DC-MHS computing devices 206a-206c may be provided by the IHS 100 discussed above with reference to FIG. 1, and/or may include some or all of the components of the IHS 100, and in specific examples may be provided by respective server devices. However, while illustrated and discussed as being provided by server devices, one of skill in the art in possession of the present disclosure will recognize that DC-MHS computing devices provided in the DC-SCM as-a-service system 200 may include any device(s) that may be configured to operate similarly as the DC-MHS computing devices 206a-206c discussed below.

Continuing with the specific examples discussed above, some embodiments of the present disclosure enable the DC-MHS computing devices 206a-206c to be configured to perform DC-SCM functionality via the "cloud-based" DC-SCMaaS portal provided by the DC-SCM as-a-service provisioning system 202. For example, network administrator(s) or other user(s) that control the DC-MHS computing devices 206a-206c may pay a provider of the DC-SCM as-a-service provisioning system 202 to access the DC-SCMaaS portal in order to enable DC-SCM functionality on the computing devices 206a-206c. As such, all of the computing devices 206a-206c may be controlled by the same entity to have DC-SCM functionality enabled thereon, or respective entities may control subsets of the computing devices 206a-206c to have DC-SCM functionality enabled thereon.

In the illustrated embodiment, at least one administrator device 208 is coupled to the DC-SCM as-a-service provisioning system 202 via the network 204. In an embodiment, the administrator device(s) 208 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, and/or other administrator devices that would be apparent to one of skill in the art in possession of the present disclosure. However, while illustrated and discussed as being provided by particular administrator devices, one of skill in the art in possession of the present disclosure will recognize that administrator devices provided in the DC-SCM as-a-service system 200 may include any device(s) that may be configured to operate similarly as the administrator device 208 discussed below.

Continuing with the specific examples discussed above, any of the administrator device(s) 208 may be controlled by a network administrator or other user that controls the DC-MHS computing device that is configured with the DC-SCM functionality as described below. Furthermore, while a specific DC-SCM as-a-service system 200 has been illustrated and described, one of skill in the art in possession of the present disclosure will recognize that the DC-SCM as-a-service system of the present disclosure may include a variety of components and component configurations while remaining within the scope of the present disclosure as well.

Figure 3:
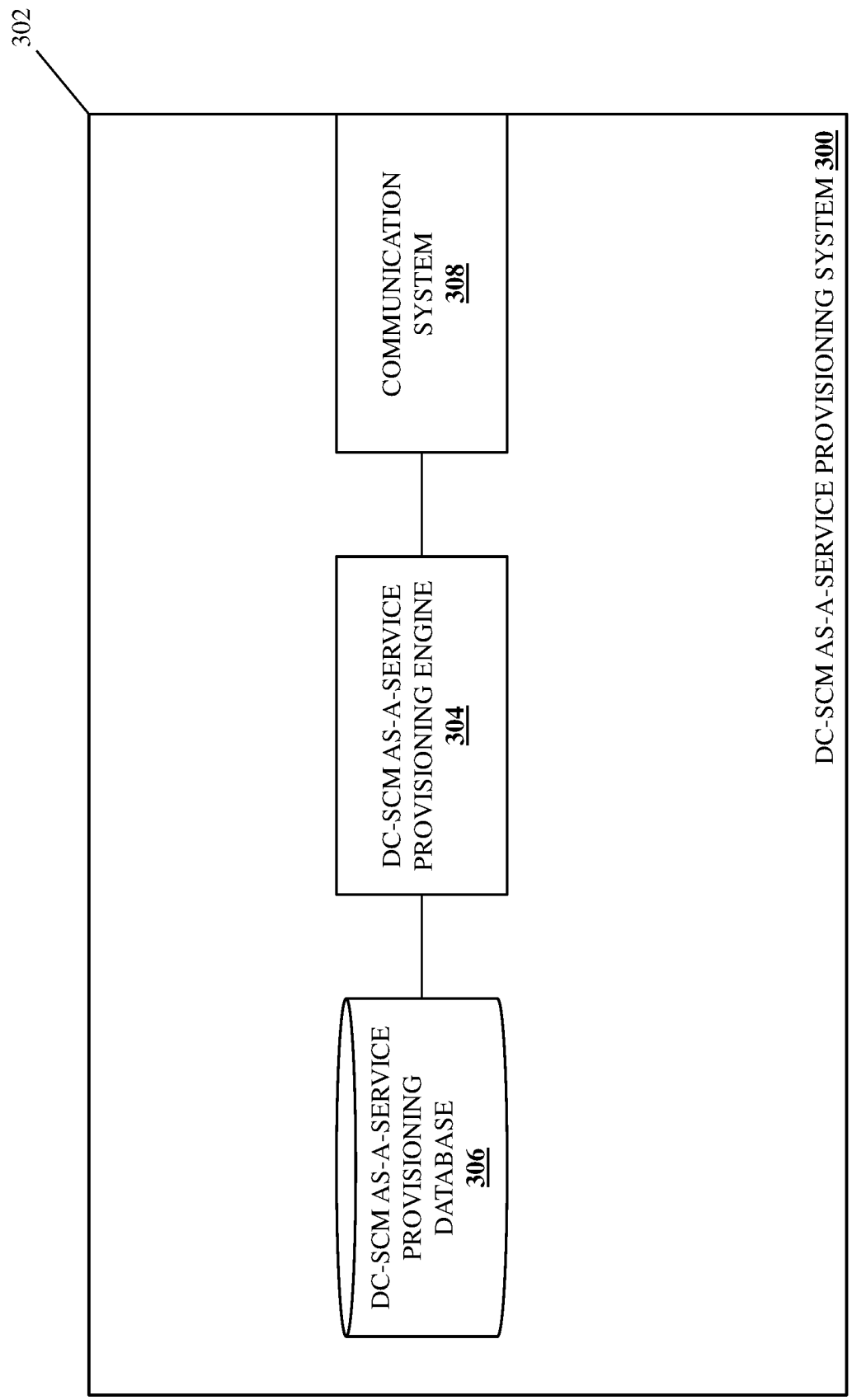
FIG. 3 is a schematic view illustrating an embodiment of a DC-SCM as-a-service provisioning system that may be included in the DC-SCM as-a-service system of FIG. 2.

Referring now to FIG. 3, an embodiment of a DC-SCM as-a-service provisioning system 300 is illustrated that may provide the DC-SCM as-a-service provisioning system 202 discussed above with reference to FIG. 2. As such, the DC-SCM as-a-service provisioning system 300 may be provided by the IHS 100 discussed above with reference to FIG. 1 and/or may include some or all of the components of the IHS 100, and in specific examples may be provided by one or more server devices. However, while illustrated and discussed as being provided by server device(s), one of skill in the art in possession of the present disclosure will recognize that the functionality of the DC-SCM as-a-service provisioning system 300 discussed below may be provided by other devices that are configured to operate similarly as the DC-SCM as-a-service provisioning system 300 discussed below.

In the illustrated embodiment, the DC-SCM as-a-service provisioning system 300 includes a chassis 302 that houses the components of the DC-SCM as-a-service provisioning system 300, only some of which are illustrated and described below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a DC-SCM as-a-service provisioning engine 304 that is configured to perform the functionality of the DC-SCM as-a-service provisioning engines and/or DC-SCM as-a-service provisioning systems discussed below.

As discussed above, in the specific examples provided herein, some embodiments of the present disclosure configure the DC-SCM as-a-service provisioning engine 304 to provide a "cloud-based" DC-SCMaaS portal through for which users may pay (e.g., a provider of the DC-SCM as-a-service provisioning system 300) to access and enable DC-SCM functionality on computing devices that do not include a DC-SCM. For example, the DC-SCM as-a-service provisioning engine 304 may be configured to provide a DC-SCMaaS user interface through the network 204 for display to network administrators or other users of the administrator device(s) 208 for use in interacting with the DC-SCMaaS portal, although one of skill in the art in possession of the present disclosure will appreciate how the functionality discussed below may be provided in other implementations while remaining within the scope of the present disclosure as well.

The chassis 302 may also house a storage system (not illustrated, but which may include the storage 108 discussed above with reference to FIG. 1) that is coupled to the DC-SCM as-a-service provisioning engine 304 (e.g., via a coupling between the storage system and the processing system) and that includes a DC-SCM as-a-service provisioning database 306 that is configured to store any of the information utilized by the DC-SCM as-a-service provisioning engine 304 discussed below. The chassis 302 may also house a communication system 308 that is coupled to the DC-SCM as-a-service provisioning engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific DC-SCM as-a-service provisioning system 300 has been illustrated and described, one of skill in the art in possession of the present disclosure will recognize that DC-SCM as-a-service provisioning systems (or other devices operating according to the teachings of the present disclosure in a manner similar to that described below for the DC-SCM as-a-service provisioning system 300) may include a variety of components and/or component configurations for providing conventional server device functionality, as well as the DC-SCM as-a-service functionality discussed below, while remaining within the scope of the present disclosure as well.

Figure 4:
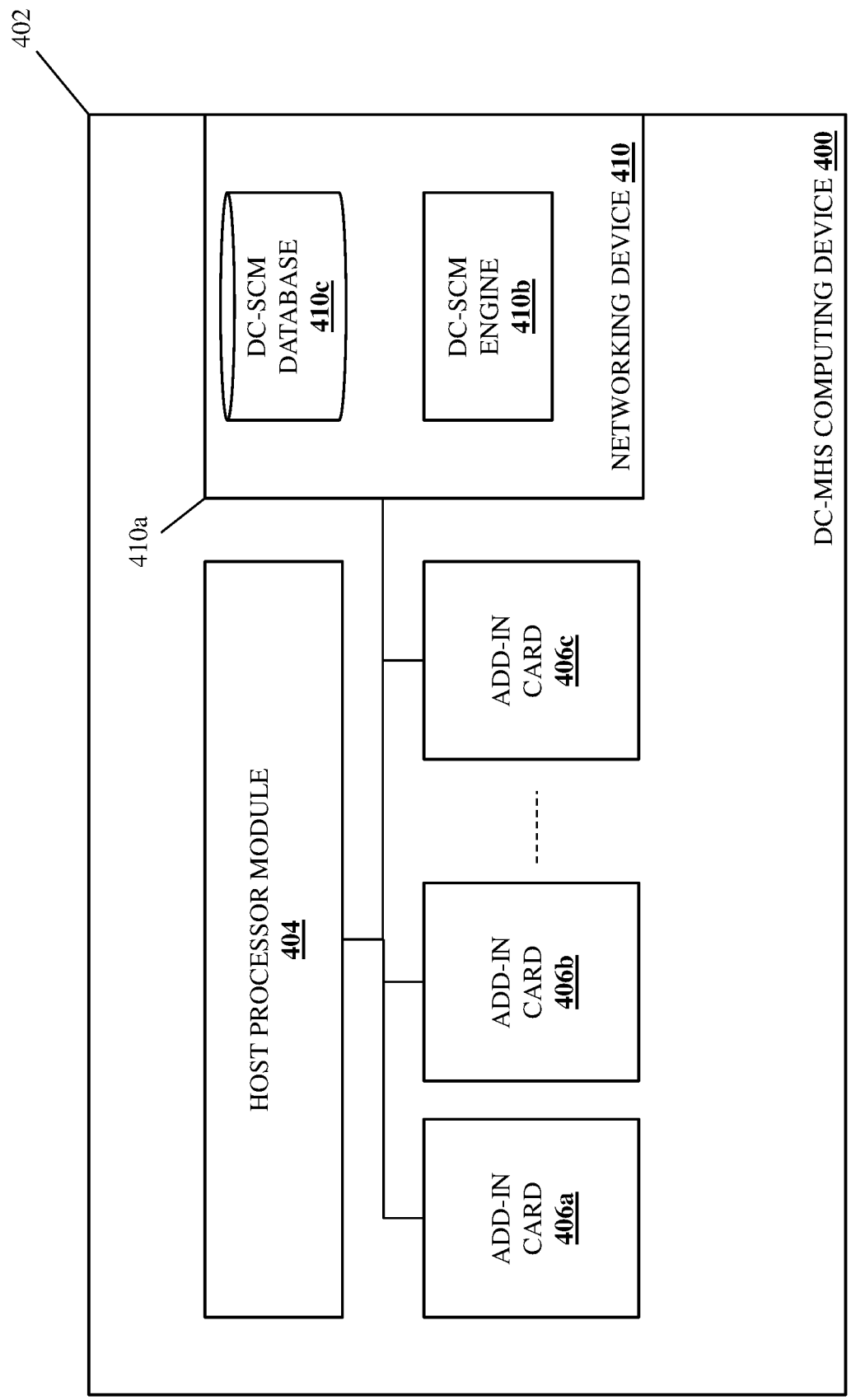
FIG. 4 is a schematic view illustrating an embodiment of a DC-MHS computing device that may be included in the DC-SCM as-a-service system of FIG. 2.

Referring now to FIG. 4, an embodiment of a DataCenter Modular Hardware System (DC-MHS) computing device 400 is illustrated that may provide any or each of the DC-MHS computing devices 206a-206c discussed above with reference to FIG. 2. As such, the DC-MHS computing device 400 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the DC-MHS computing device 400 discussed below may be provided by other devices that are configured to operate similarly as the DC-MHS computing device 400 discussed below.

In the illustrated embodiment, the DC-MHS computing device 400 includes a chassis 402 that houses the components of the DC-MHS computing device 400, only some of which are illustrated and discussed below. For example, the chassis 402 may house a Host Processing Module (HPM) 404 that one of skill in the art in possession of the present disclosure will appreciate may be provided by a standardized processing component that provides a modular building block of a DC-MHS configuration. In a specific example, the HPM 404 may include a HPM form-factor and HPM subsystems that are standardized according to the DC-MHS Revision 1 (R1) to provide interoperability of the HPM 404 with the DC-MHS computing device 400, although other HPMs are envisioned as falling within the scope of the present disclosure as well.

Furthermore, the chassis 402 may also house a plurality of Add-In Cards (AICs) 406a, 406b, and up to 406c, each of which may be coupled to the HPM 404, and each of which may be provided by standardized components that one of skill in the art in possession of the present disclosure will recognize provide modular building blocks of a DC-MHS configuration. For example, each of the AICs 406a-406c may provide a DC-MHS module that may be provided in the DC-MHS computing device 400 and coupled to the HPM 404 in order to provide the DC-MHS computing device 400 functionality enabled by that AIC. To provide some specific examples, the AICs 406a-406c may be included in a Data Processing Unit (DPU) system or Infrastructure Processing Unit (IPU) system that includes a programmable processor that integrates a general purpose Central Processing Unit (CPU) with network interface hardware, and may be configured to provide microservices functionality, networking functionality, encryption functionality, and/or any other functionality that would be apparent to one of skill in the art in possession of the present disclosure.

As illustrated, the chassis 402 may also house a networking device 410 that is coupled to the HPM 404 and each of the AICs 406a-406c. In many of the examples included below, the networking device 410 is provided by a "Smart" Network Interface Controller (SmartNIC) device that one of skill in the art in possession of the present disclosure will appreciate may include a programmable accelerator that may be configured to enhance datacenter networking, security, and storage, offload processing from a Central Processing Unit (CPU) in the computing device 400, and/or may perform other conventional SmartNIC operations known in the art. As such, in some embodiments the networking device 410 may provide the DPU system or IPU system that includes the AICs 406a-406c discussed above. However, while described as a SmartNIC, one of skill in the art in possession of the present disclosure will appreciate how other networking devices will fall within the scope of the present disclosure as well.

In the illustrated embodiment, the networking device 410 includes a chassis 410a (e.g., a circuit board) that supports the components of the networking device 410, only some of which are illustrated and described below. For example, the chassis 402 may support a networking device processing system (not illustrated, but which may be similar to the processor 102 discussed above with reference to FIG. 1 and may be provided by the programmable processor in the DPU system or IPU system discussed above that integrates a general purpose CPU with network interface hardware) and a networking device memory system (not illustrated, but which may be similar to the memory 114 discussed above with reference to FIG. 1) that is coupled to the networking device processing system and that includes instructions that, when executed by the networking device processing system, cause the networking device processing system to provide a DC-SCM engine 410b that is configured to perform the functionality of the DC-SCM engines and/or networking devices discussed below.

The chassis 410a may also support a storage system (not illustrated, but which may be similar to the storage 108 discussed above with reference to FIG. 1) that is coupled to the DC-SCM engine 410b (e.g., via a coupling between the storage system and the networking device processing system) and that includes a DC-SCM database 410c that is configured to store any of the information utilized by the DC-SCM engine 410b discussed below. While not illustrated or described in detail, one of skill in the art in possession of the present disclosure will appreciate how the chassis 410a may also support communication components that are coupled to the DC-SCM engine 410b and the DC-SCM database 410c (e.g., via a coupling between the communication system and the networking device processing system and networking device storage system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

As will be appreciated by one of skill in the art in possession of the present disclosure, the DC-MHS computing device 400 includes a DC-MHS configuration having the HPM 404 and AICs 406a-406c, but does not include a DC-SCM that is present in conventional DC-MHS configuration. As described below, at least some of the functionality of conventional DC-SCMs (e.g., the BIOS and BMC functionality detailed below) may be provided by the networking device 410 in order to initialize, manage, secure, and/or control the HPM 404, the AICs 406a-406c, and/or the computing device 400. In a specific example, the network administrator or other user of the computing device 400 may require SmartNIC functionality in the computing device 400, and thus may require a SmartNIC device that is provided by the networking device 410 in the computing device 400.

As discussed below, such a SmartNIC device (or other capable networking devices) may be configured to perform DC-SCM functionality so that the relatively expensive DC-SCM may be omitted from the computing device 400 (as illustrated) in order to reduce the cost and complexity of the computing device 400. For example, a user ordering a DC-MHS computing device from a DC-MHS computing device provider may configure that DC-MHS computing device with a SmartNIC device and, in response, may be provided with an option to omit the DC-SCM from that DC-MHS computing device and utilize the DC-SCMaaS functionality discussed below in its place (e.g., for a fee).

One of skill in the art in possession of the present disclosure will appreciate how such a configuration may be particularly desirable in embodiments where the SmartNIC device is capable of providing a subset of DC-SCM functionality available from a conventional DC-SCM and "full" DC-SCM functionality is not needed in the computing device 400 such as, for example, when only minimal BIOS and BMC functionality is required in the computing device 400, when BMC functionality is not needed in the computing device 400, and/or in other scenarios that would be apparent to one of skill in the art in possession of the present disclosure. However, as discussed below, SmartNIC devices that are capable of providing "full" DC-SCM functionality (i.e., DC-SCM functionality equivalent to conventional DC-SCMs) may be utilized while remaining within the scope of the present disclosure as well.

In the examples below, the networking device 410 is described as being provided in the DC-MHS computing device 400 by a DC-MHS computing device manufacturer/provider that may provide both the DC-MHS computing device 400 and the DC-SCM provisioning system 202/300 discussed above. However, one of skill in the art in possession of the present disclosure will appreciate how the networking device 410 may be provided by networking device manufacturers that are different than the DC-MHS computing device manufacturer/provider and/or the provider of the DC-SCM provisioning system 202/300 as long as that networking device is configured (e.g., according to standards set by the provider of the DC-SCM provisioning system 202/300 and/or other entities) to allow for the DC-SCMaaS functionality described below.

However, while a specific DC-MHS computing device 400 has been illustrated and described, one of skill in the art in possession of the present disclosure will recognize that DC-MHS computing devices (or other devices operating according to the teachings of the present disclosure in a manner similar to that described below for the DC-MHS computing device 400) may include a variety of components and/or component configurations for providing conventional computing device functionality, as well as the DC-SCM as-a-service functionality discussed below, while remaining within the scope of the present disclosure as well.

Figure 5:
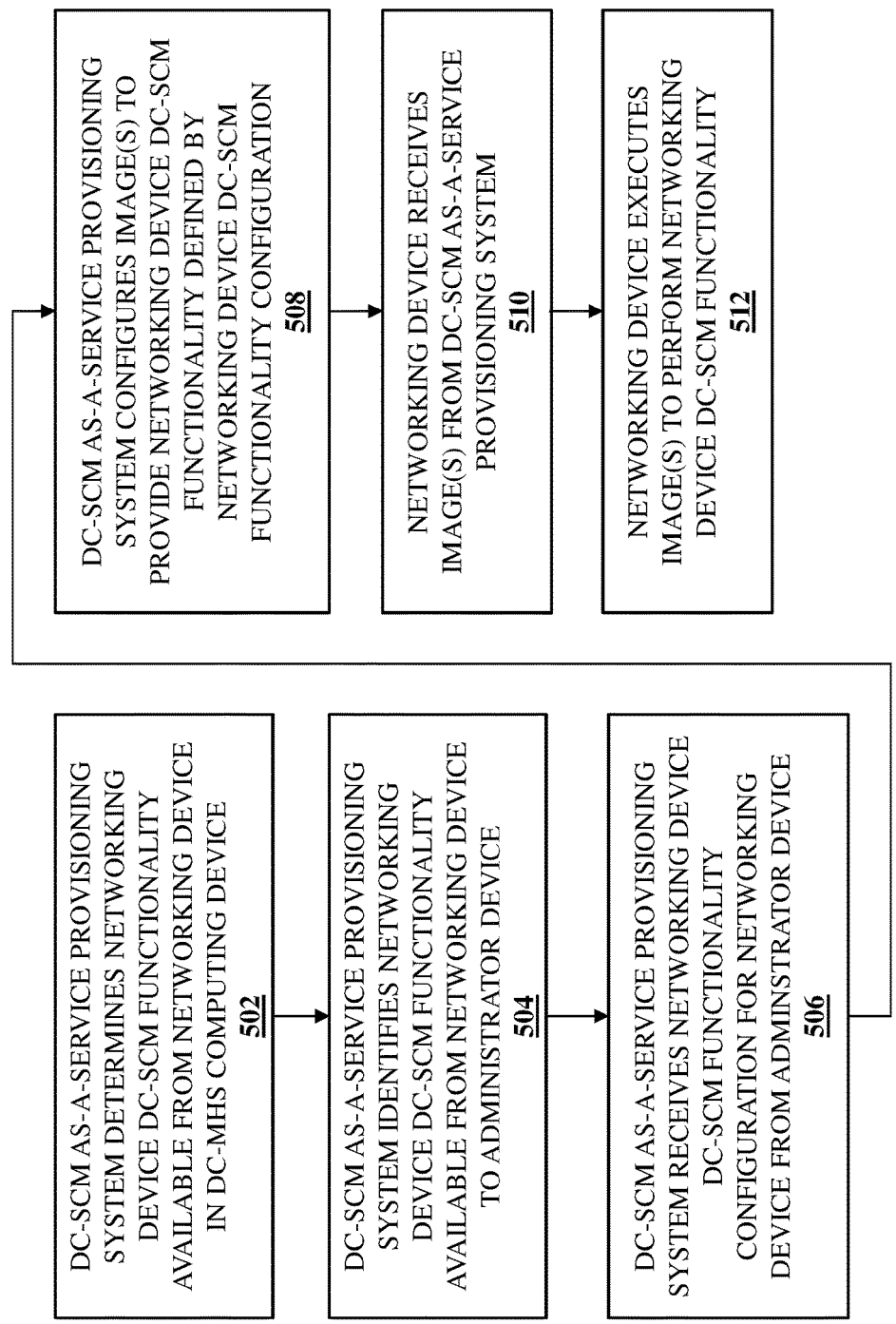
FIG. 5 is a flow chart illustrating an embodiment of a method for providing DC-SCM functionality as a service.

Referring now to FIG. 5, an embodiment of a method 500 for providing DataCenter Secure Control Module (DC-SCM) functionality as a service is illustrated. As discussed below, the systems and methods of the present disclosure provide for the configuration of a networking device in a computing device to perform DC-SCM functionality. For example, the DC-SCM as-a-service system of the present disclosure may include a DataCenter Modular Hardware System (DC-MHS) computing device having a Host Processor Module (HPM) and a networking device that is coupled to the HPM and a network, and a DC-SCM provisioning system that is coupled to the networking device via the network. The DC-SCM provisioning system provides a networking device service instance for the networking device, receives a networking device DC-SCM functionality configuration for the networking device through the network via the networking device service instance, and configures at least one image to provide networking device DC-SCM functionality defined by the networking device DC-SCM functionality configuration. The networking device receives the at least one image via the network, and executes the at least one image to perform the networking device DC-SCM functionality with the HPM. As such, DC-MHS computing devices that require networking device functionality and a corresponding networking device may configure that networking device to perform DC-SCM functionality in order to allow the DC-SCM that would conventionally be required for that DC-MHS computing device to be omitted, reducing the cost and complexity of that DC-MHS computing device.

As will be appreciated by one of skill in the art in possession of the present disclosure, the method 500 is described below according to the specific examples discussed above in which a network administrator or other user pays a provider of the DC-SCM as-a-service provisioning system 202 to enable DC-SCM functionality on their DC-MHS computing device. As such, that network administrator or other user may order the DC-MHS computing device 400 from a DC-MHS computing device manufacturer (which may be the same entity as the provider of the DC-SCM as-a-service provisioning system 202 such as, for example, DELL® Inc. of Round Rock, Texas, United States) configured as described above with reference to FIG. 4 (e.g., with the DC-MHS configuration that replaces a conventional DC-SCM with the networking device 410), may subscribe to the DC-SCMaaS system, and may connect that DC-MHS computing device to the network 204.

Figure 6B:
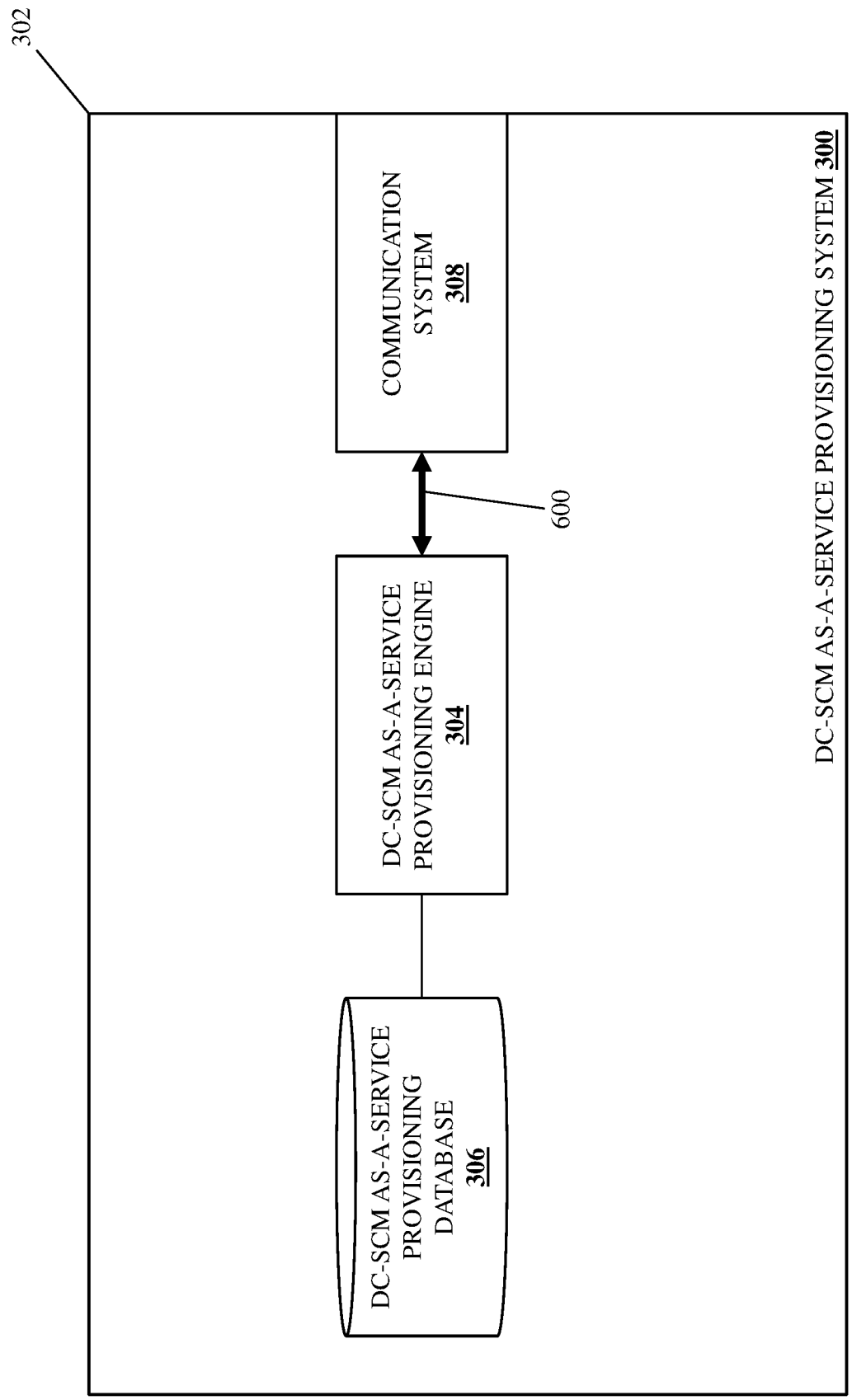
FIG. 6B is a schematic view illustrating an embodiment of the DC-SCM as-a-service provisioning system of FIG. 3 operating during the method of FIG. 5.
Figure 6C:
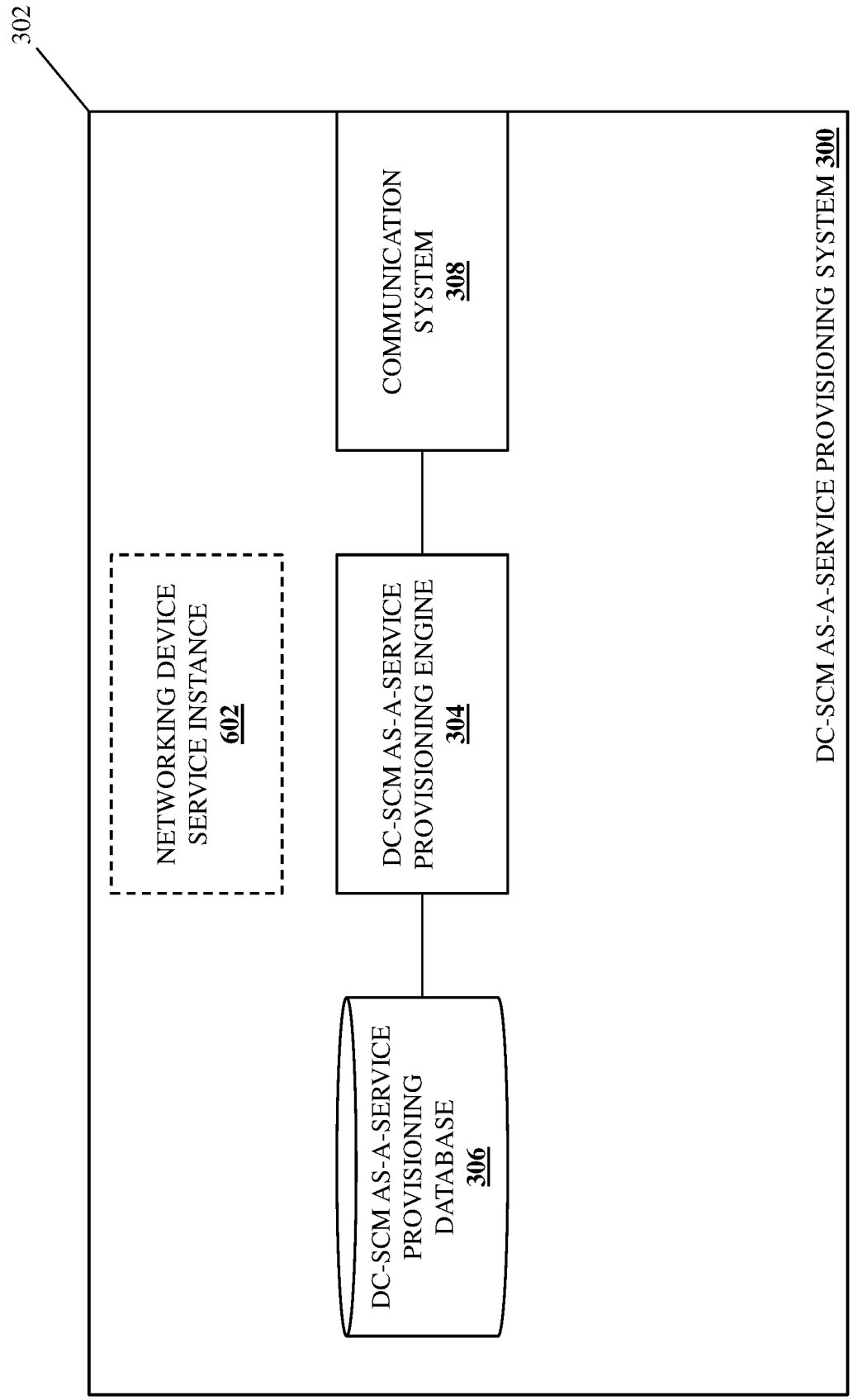
FIG. 6C is a schematic view illustrating an embodiment of the DC-SCM as-a-service provisioning system of FIG. 3 operating during the method of FIG. 5.

With reference to FIGS. 6A, 6B, and 6C, during or prior to the method 500, the DC-SCM as-a-service provisioning engine 304 in the DC-SCM as-a-service provision system 202/300 and one of the administrator device(s) 208 may perform DC-MHS computing device registration operations 600 that may include the DC-SCM as-a-service provisioning engine 304 communicating through its communication system 310 and the network 204 with one of the administrator device(s) 208 (i.e., the administrator device 208 controlled by the network administrator or other user that controls the DC-MHS computing device 206a in the examples below) to register the DC-MHS computing device 206a with the DC-SCM as-a-service provisioning system 202/300, which one of skill in the art in possession of the present disclosure will appreciate may include the exchange of any information (e.g., via the DC-SCMaaS user interface discussed above) that allows the DC-SCM as-a-service provisioning engine 304 to provide a networking device service instance 602 for the networking device 410 in the DC-SCM as-a-service provisioning system 202/300, as illustrated in FIG. 6C.

As described below, the networking device service instance 602 may include a "cloud-based" DC-SCMaaS portal instance of the networking device 410 in the DC-MHS computing device 206a/400 that may be used to configure the networking device 410 in the DC-MHS computing device 206a/400 to perform the DC-SCM functionality as described below, and one of skill in the art in possession of the present disclosure will appreciate how the networking device service instance 602 may be provided and utilized as discussed below using any of a variety of service instance provisioning and utilization techniques that will fall within the scope of the present disclosure. However, while the method 500 is described herein as being performed on the DC-MHS computing device 206a in the DC-SCM as-a-service system 200 discussed above with reference to FIG. 2, the method 500 may be performed on any of the DC-MHS computing devices 206b-206c (or more than one of the DC-MHS computing devices 206a-206c similarly as described for the single DC-MHS computing device 206a discussed below) while remaining within the scope of the present disclosure as well.

Figure 7A:
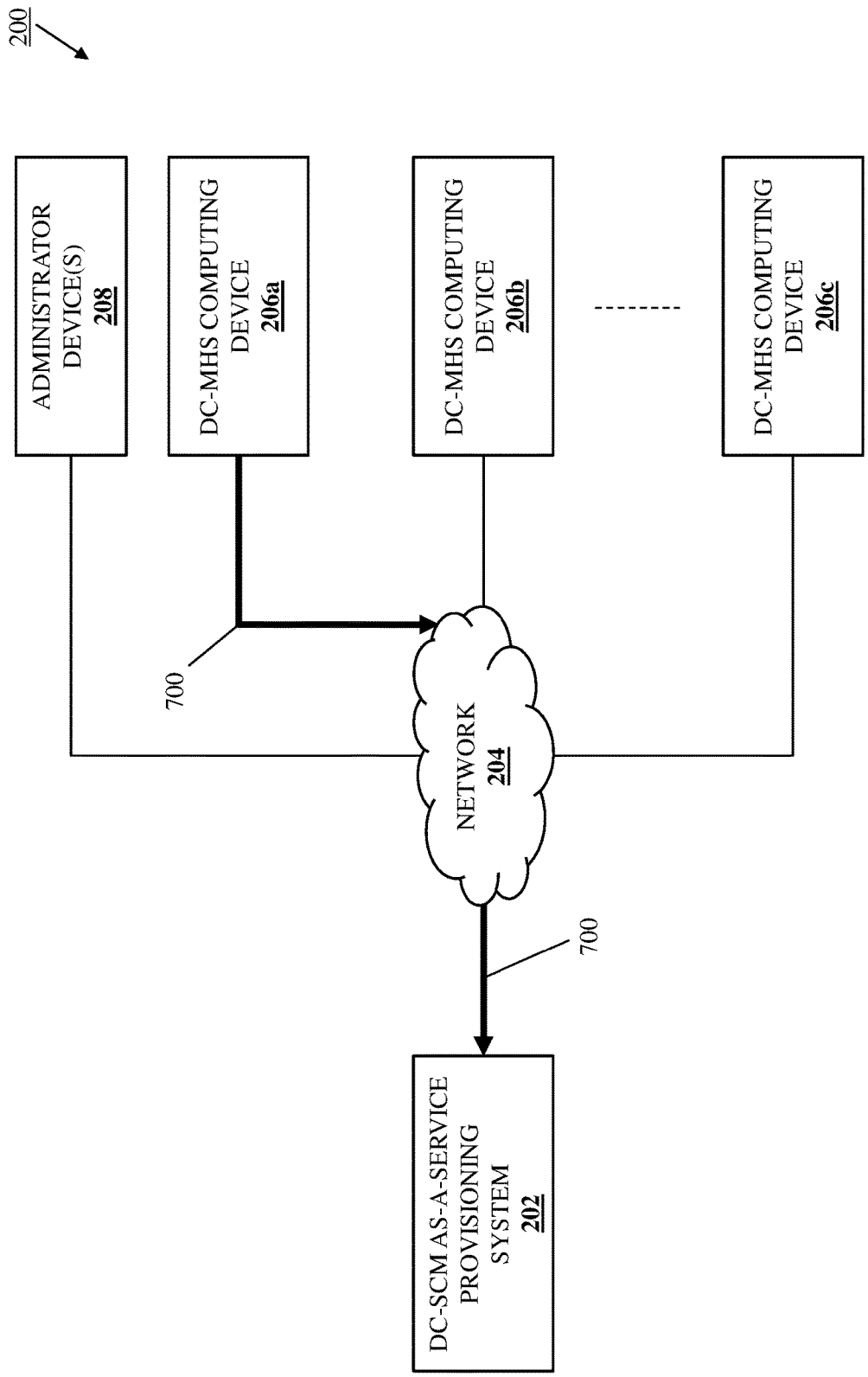
FIG. 7A is a schematic view illustrating an embodiment of the DC-SCM as-a-service system of FIG. 2 operating during the method of FIG. 5.
Figure 7B:
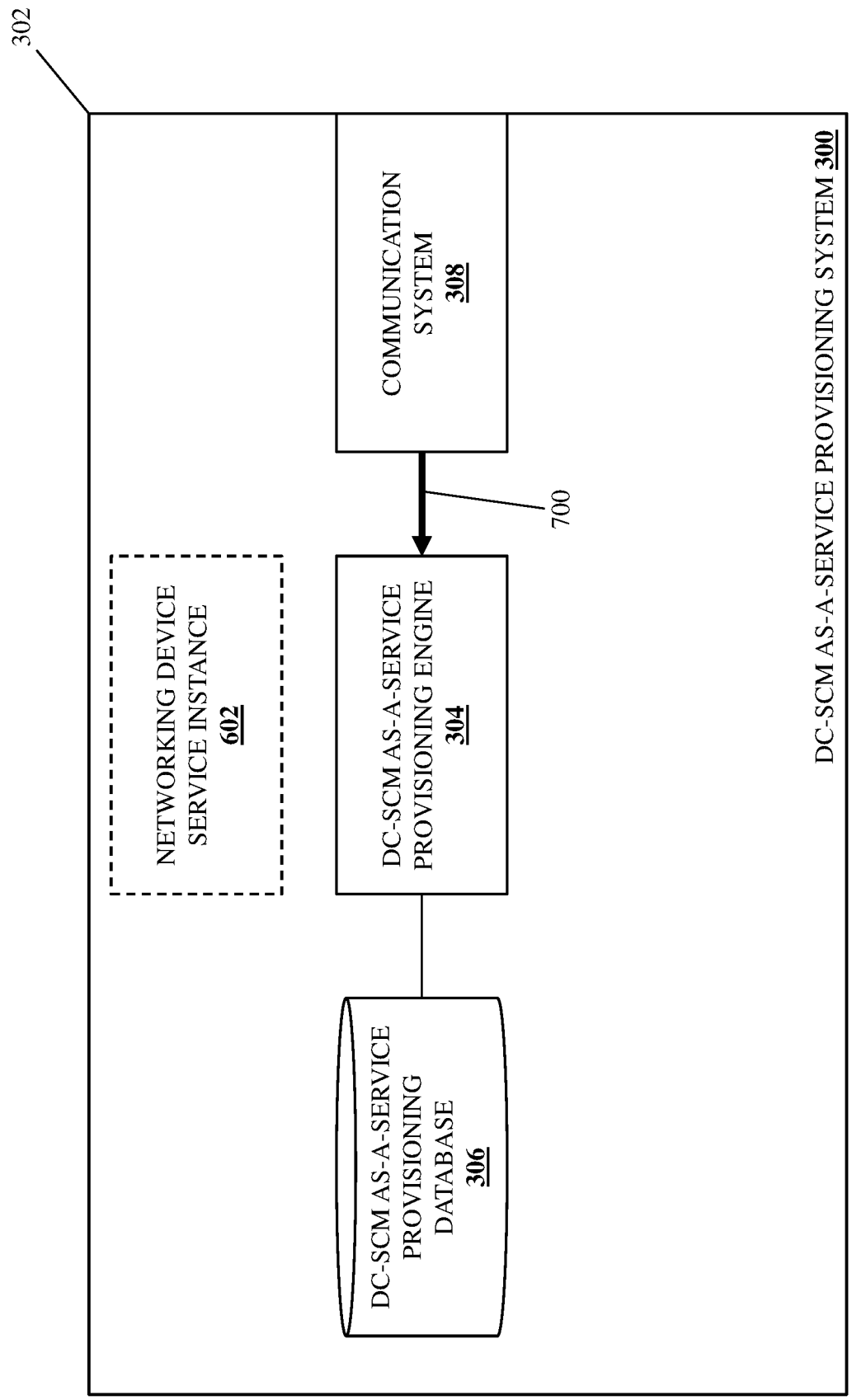
FIG. 7B is a schematic view illustrating an embodiment of the DC-SCM as-a-service provisioning system of FIG. 3 operating during the method of FIG. 5.

The method 500 begins at block 502 where a DC-SCM as-a-service provisioning system determines networking device DC-SCM functionality available in a networking device in a DC-MHS computing device. With reference to FIGS. 7A and 7B, in an embodiment of block 502, the DC-SCM as-a-service provisioning engine 304 in the DC-SCM as-a-service provision system 202/300 may perform networking device capability determination operations 700 that may include accessing the networking device 410 in the DC-MHS computing device 206a/400 through its communication system 310 and via the network 204 (e.g., using access information that may be received via the registration of the DC-MHS computing device 206a/400 discussed above), and determining networking device capabilities of the networking device 410. For example, the networking device capabilities of the networking device 410 may be determined at block 502 by via a microservice provided on the DPU system or IPU system discussed above that is configured to register and publish networking device capabilities to the DC-SCM as-a-service provision system 202/300, and/or using any other networking device capability determination techniques that would be apparent to one of skill in the art in possession of the present disclosure.

As will be appreciated by one of skill in the art in possession of the present disclosure, the networking device capabilities of the networking device 410 determined at block 502 may include processing capabilities of a processing subsystem in the networking device 410, memory capabilities of a memory subsystem in the networking device 410, microservice capabilities of a microservice subsystem in the networking device 410, networking capabilities of a networking subsystem in the networking device 410, encryption capabilities of an encryption subsystem in the networking device 410, and/or any other networking device capabilities that would be apparent to one of skill in the art in possession of the present disclosure.

The DC-SCM as-a-service provisioning engine 304 in the DC-SCM as-a-service provision system 202/300 may then perform networking device DC-SCM functionality determination operations that may include determining networking device DC-SCM functionality that is available from the networking device 410 in the DC-MHS computing device 206a/400 based on the networking device capabilities determined for the networking device 410. As will be appreciated by one of skill in the art in possession of the present disclosure, the networking device capabilities determined for the networking device 410 may correspond to networking device DC-SCM functionality that is available from the networking device 410, and the DC-SCM as-a-service provisioning engine 304 may use a variety of techniques to map, identify, and/or otherwise determine the networking device DC-SCM functionality that is available from the networking device 410 based on its networking device capabilities. 0 However, while specific examples of the determination of networking device DC-SCM functionality available from the networking device have been described, one of skill in the art in possession of the present disclosure will appreciate how available networking device DC-SCM functionality may be determined in a variety of manners that will fall within the scope of the present disclosure as well.

Figure 8A:
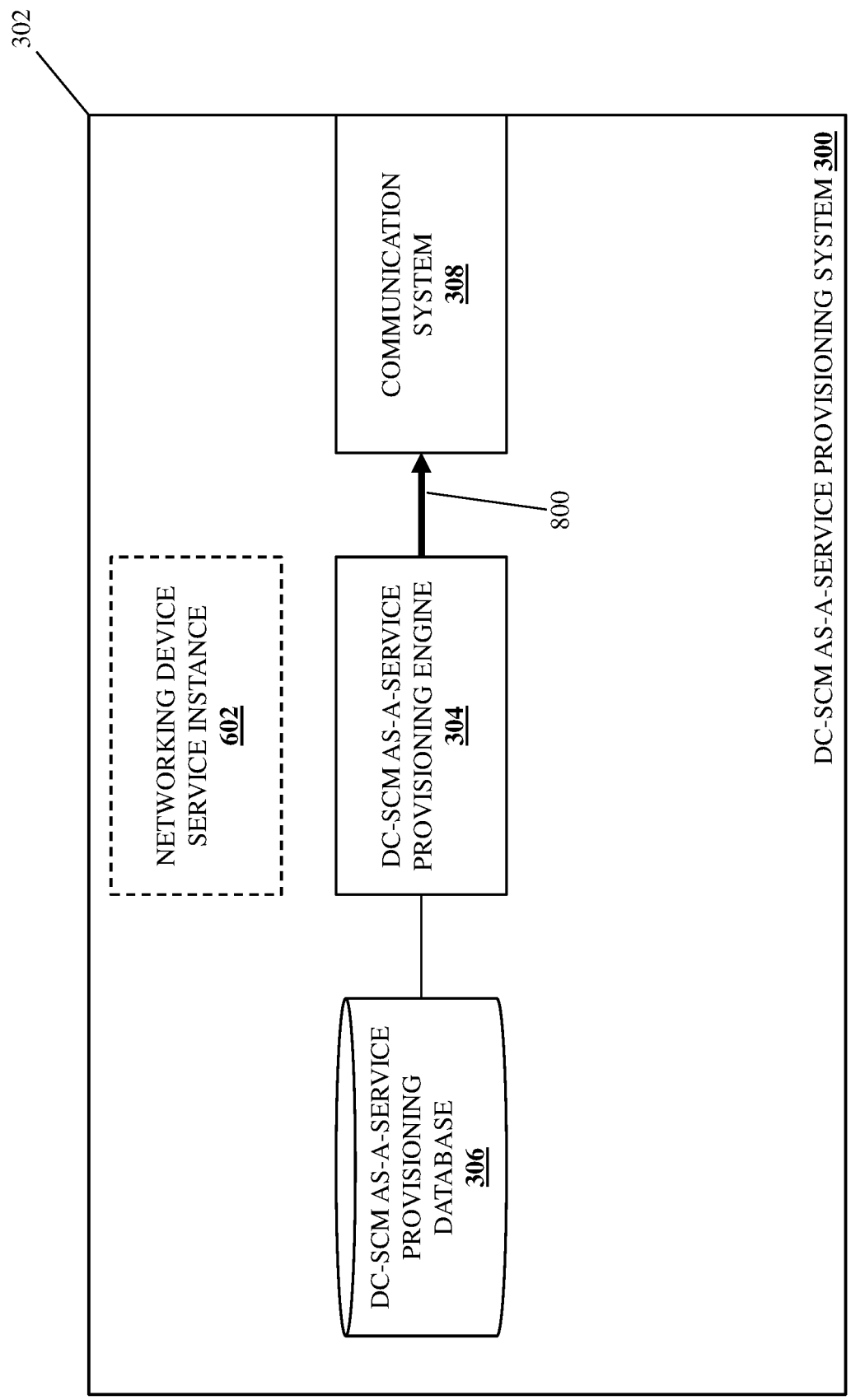
FIG. 8A is a schematic view illustrating an embodiment of the DC-SCM as-a-service provisioning system of FIG. 3 operating during the method of FIG. 5.
Figure 8B:
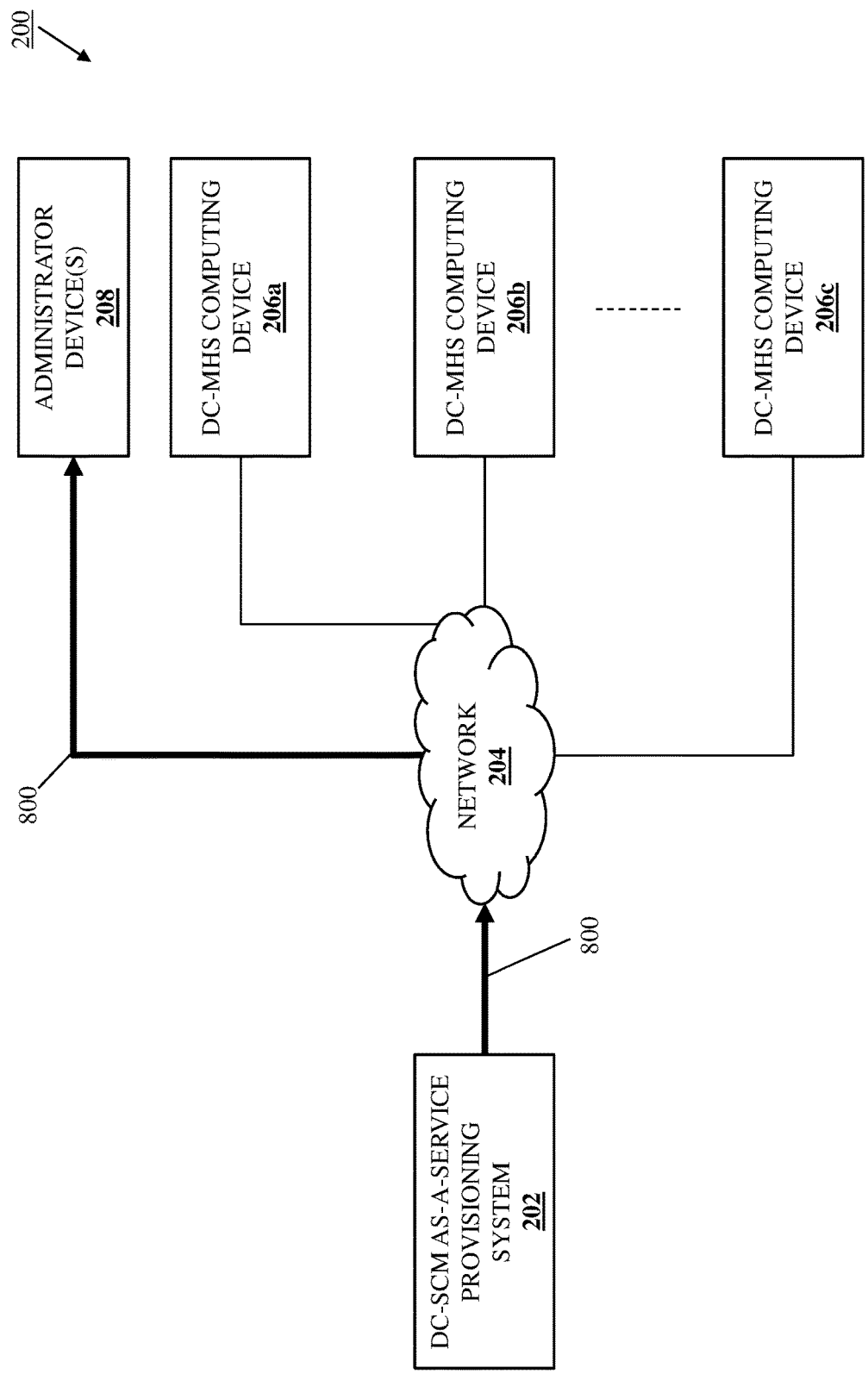
FIG. 8B is a schematic view illustrating an embodiment of the DC-SCM as-a-service system of FIG. 2 operating during the method of FIG. 5.

The method 500 then proceeds to block 504 where the DC-SCM as-a-service provisioning system identifies the networking device DC-SCM functionality in the networking device to an administrator device. With reference to FIGS. 8A and 8B, in an embodiment of block 504, the DC-SCM as-a-service provisioning engine 304 in the DC-SCM as-a-service provisioning system 202/300 may perform networking device DC-SCM functionality identification operations 800 that include communicating through its communication system 310 and the network 204 with one of the administrator device(s) 208 (i.e., the administrator device 208 controlled by the network administrator or other user that controls the DC-MHS computing device 206a in the examples below) to identify the networking device DC-SCM functionality that is available from the networking device 410 in the DC-MHS computing device 206a/400.

For example, at block 504, the DC-SCM as-a-service provisioning engine 304 may utilize the DC-SCMaaS user interface discussed above to list a plurality of networking device DC-SCM functions that are available from the networking device 410 by, for example, displaying each respective networking device DC-SCM function that provides the networking device DC-SCM functionality that is available from the networking device 410 with a selectable element (e.g., a "check box") that is configured to allow a network administrator or other user of the administrator device 208 to select that networking device DC-SCM function. However, while a specific example of the identification of networking device DC-SCM functionality has been described, one of skill in the art in possession of the present disclosure will appreciate how networking device DC-SCM functionality may be identified in a variety of manners that will fall within the scope of the present disclosure as well.

In some specific examples, the networking device DC-SCM functionality determined to be available from the networking device 410 and identified as being available from the networking device 410 may be the same DC-SCM functionality available from conventional DC-SCMs (e.g., in embodiments in which the networking device includes relatively sophisticated networking device capabilities and is configurable to perform that DC-SCM functionality). As such, the plurality of networking device DC-SCM functions listed in the DC-SCMaaS user interface discussed above may include BIOS functions, BMC functions, and/or any other DC-SCM functions that one of skill in the art in possession of the present disclosure would recognize as being available from a conventional DC-SCM.

In other specific examples, the networking device DC-SCM functionality determined to be available from the networking device 410 and identified as being available from the networking device 410 may be different than the DC-SCM functionality available from conventional DC-SCMs (e.g., in embodiments in which the networking device includes relatively less sophisticated networking device capabilities and is configurable to perform a subset of that DC-SCM functionality). As such, the plurality of networking device DC-SCM functions listed in the DC-SCMaaS user interface discussed above may include subsets of BIOS functions, subsets of BMC functions, and/or subsets of any other DC-SCM functions that one of skill in the art in possession of the present disclosure would recognize as being available from a conventional DC-SCM.

To provide yet another specific example, a SmartNIC that provides the networking device 410 in the DC-MHS computing device 206a/400 may include capabilities to perform any BIOS functions available from a conventional DC-SCM, and may include capabilities to perform a subset of BMC functions available from a conventional DC-SCM (e.g., the SmartNIC may include capabilities to perform BMC telemetry and sensor data functions, BMC management user interface provisioning functions, and BMC security functions, but may not include capabilities to perform BMC firmware update functions or BMC group management functions). As such, the plurality of networking device DC-SCM functions listed in the DC-SCMaaS user interface discussed above may include all of the BIOS functions that one of skill in the art in possession of the present disclosure would recognize as being available from a conventional DC-SCM, and the subset of the BMC functions discussed above that are available from a conventional DC-SCM, while not including the subset of BMC functions that the SmartNIC is not capable of providing.

Figure 9A:
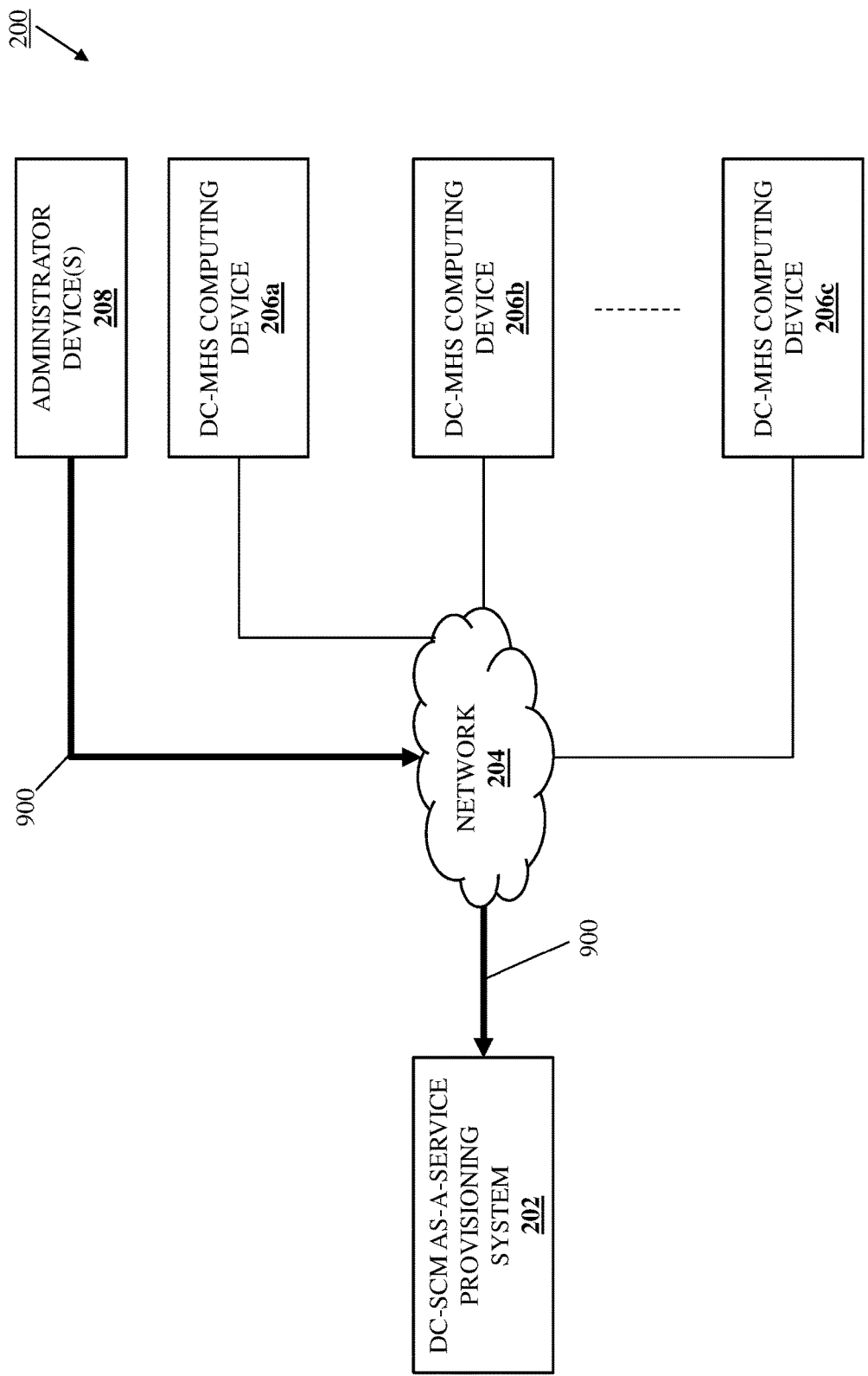
FIG. 9A is a schematic view illustrating an embodiment of the DC-SCM as-a-service system of FIG. 2 operating during the method of FIG. 5.
Figure 9B:
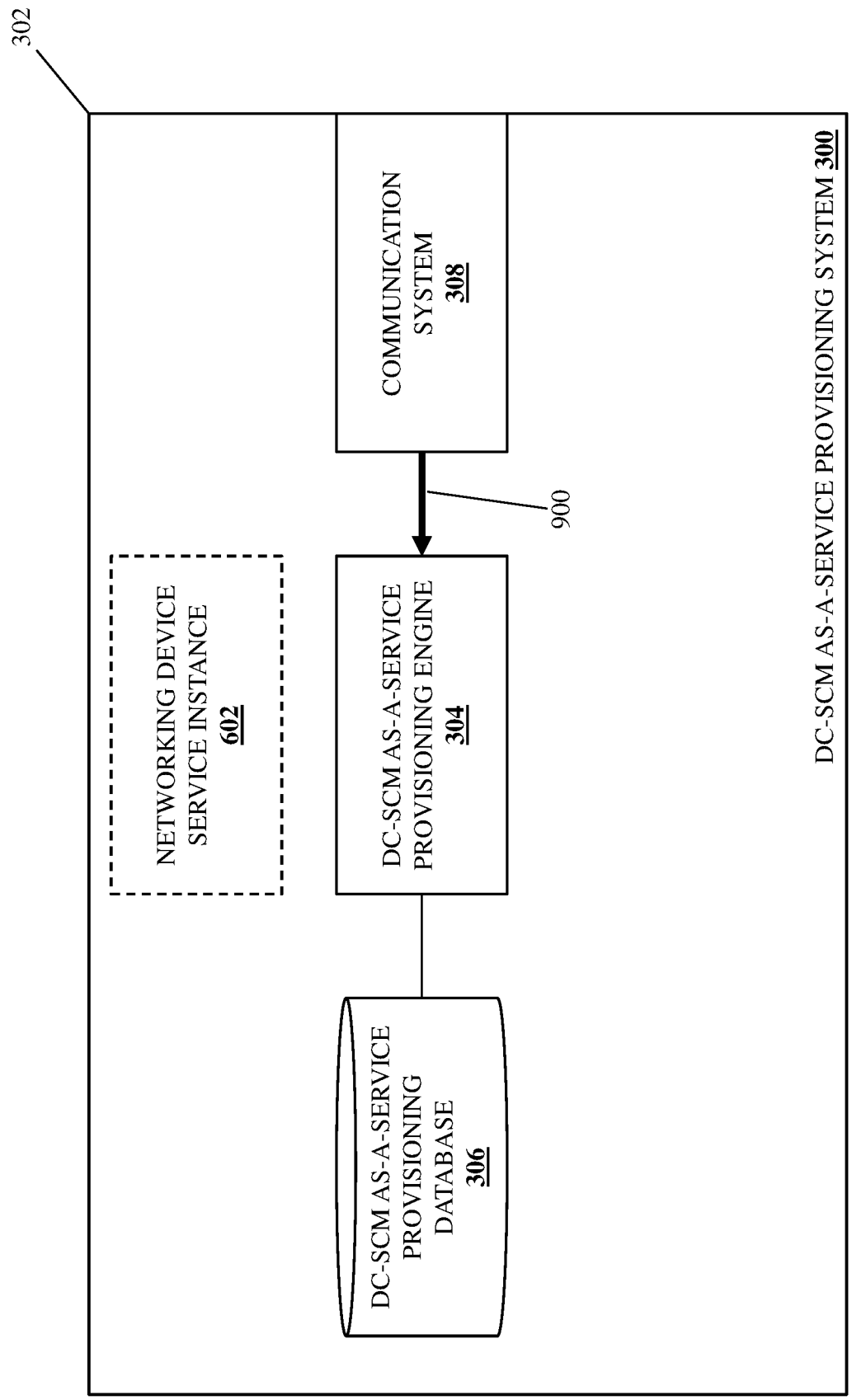
FIG. 9B is a schematic view illustrating an embodiment of the DC-SCM as-a-service provisioning system of FIG. 3 operating during the method of FIG. 5.

The method 500 then proceeds to block 506 where the DC-SCM as-a-service provisioning system receives a networking device DC-SCM functionality configuration for the networking device from the administrator device. With reference to FIGS. 9A and 9B, in an embodiment of block 506, the DC-SCM as-a-service provisioning engine 304 in the DC-SCM as-a-service provisioning system 202/300 may perform networking device DC-SCM functionality configuration receiving operations 900 that include communicating through its communication system 310 and the network 204 with one of the administrator device(s) 208 (i.e., the administrator device 208 controlled by the network administrator or other user that controls the DC-MHS computing device 206a in the examples below) to receive a networking device DC-SCM functionality configuration for the networking device 410 in the DC-MHS computing device 206a/400.

For example, at block 506, the network administrator or other user of the administrator device 208 may use the DC-SCMaaS user interface provided by the DC-SCM as-a-service provisioning engine 304 as discussed above to select, from the list a plurality of networking device DC-SCM functions that are available from the networking device 410 (e.g., via the "check boxes" or other selectable elements discussed above), one or more networking device DC-SCM functions for generate a networking device DC-SCM functionality configuration, and then may transmit that networking device DC-SCM functionality configuration (e.g., via a "send" element in the DC-SCMaaS user interface) via the network 204 to the DC-SCM as-a-service provisioning system 202/300.

As such, at block 506, the network administrator or other user of the administrator device 208 may select all of the plurality of networking device DC-SCM functions listed in the DC-SCMaaS user interface discussed above to generate a networking device DC-SCM functionality configuration that will enable all of the networking device DC-SCM functionality that is available from the networking device 410 in the DC-MHS computing device 206a/400, or may select a subset of the plurality of networking device DC-SCM functions listed in the DC-SCMaaS user interface discussed above to generate a networking device DC-SCM functionality configuration that will enable some of the networking device DC-SCM functionality that is available from the networking device 410 in the DC-MHS computing device 206a/400.

To provide a specific example, the network administrator or other user of the administrator device 208 may select a subset of the plurality of networking device DC-SCM functions listed in the DC-SCMaaS user interface discussed above to generate a networking device DC-SCM functionality configuration that will enable BIOS functionality but not BMC functionality that is available in the networking device 410 in the DC-MHS computing device 206a/400. However, while a specific example of the generation and provisioning of a networking device DC-SCM functionality configuration has been described, one of skill in the art in possession of the present disclosure will appreciate how networking device DC-SCM functionality configurations may be provided in a variety of manners that will fall within the scope of the present disclosure as well.

Figure 10:
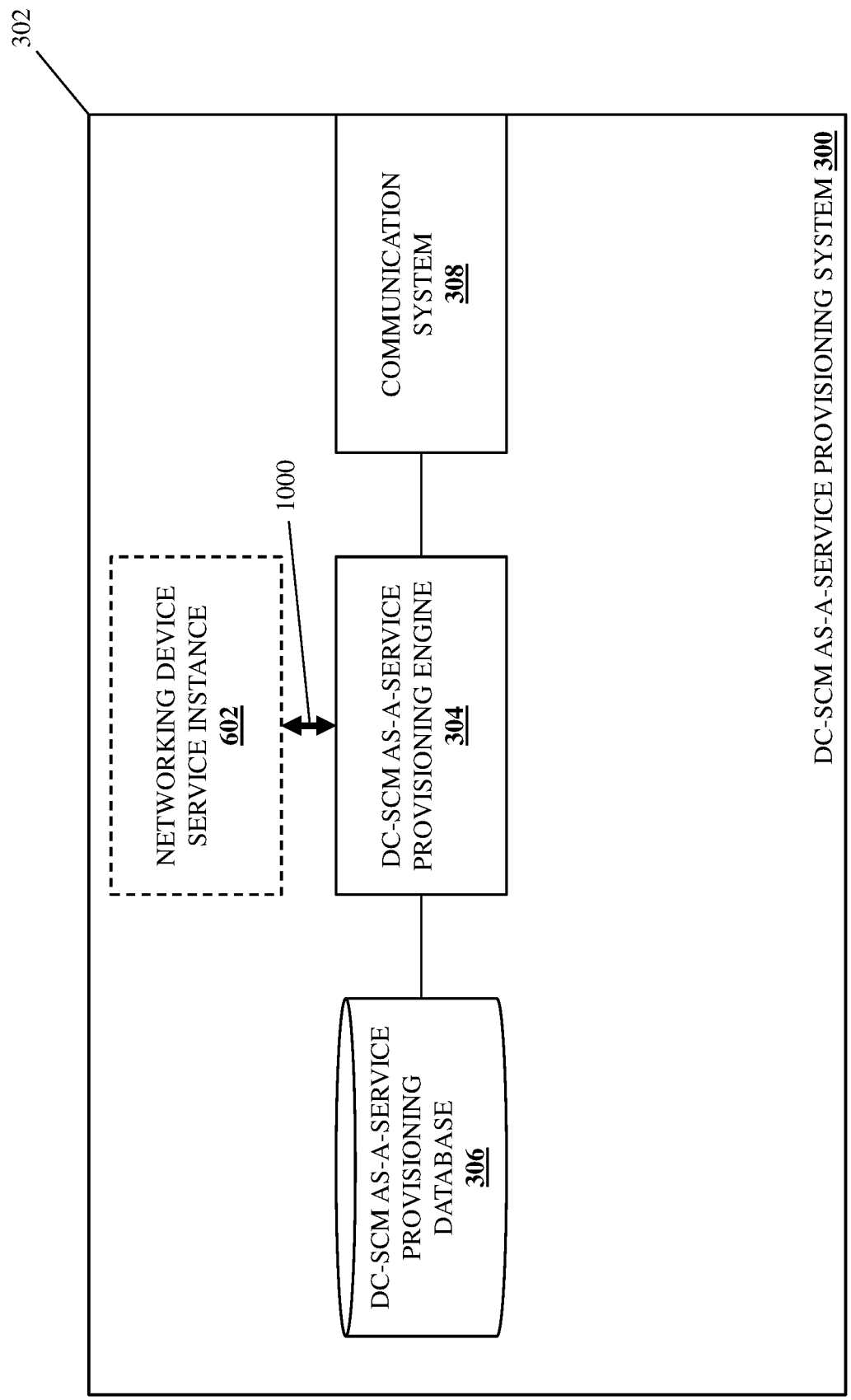
FIG. 10 is a schematic view illustrating an embodiment of the DC-SCM as-a-service provisioning system of FIG. 3 operating during the method of FIG. 5.

The method 500 then proceeds to block 508 where the DC-SCM as-a-service provisioning system configures at least one image to provide the networking device DC-SCM functionality defined by the networking device DC-SCM functionality configuration. With reference to FIG. 10, in an embodiment of block 508, the DC-SCM as-a-service provisioning engine 304 in the DC-SCM as-a-service provisioning system 202/300 may perform image configuration operations 1000 that include configuring the networking device service instance 304 provided for the networking device 410 in the DC-MHS computing device 206a/400 with a BIOS image, a BMC image, and/or other DC-SCM functionality images that one of skill in the art in possession of the present disclosure will recognize as being capable of providing the networking device DC-SCM functionality defined by the networking device DC-SCM functionality configurations described above.

For example, one of skill in the art in possession of the present disclosure will appreciate how the networking device service instance 304 provided for the networking device 410 in the DC-MHS computing device 206a/400 may be configured with image(s) as describe herein by generating and providing binary image(s) on the networking device service instance 304 that the networking device service instance 304 is configured to deploy on the networking device 410 as agent microservice(s), and/or using any of a variety of service instance/image configuration techniques known in the art.

As will be appreciated by one of skill in the art in possession of the present disclosure, any BIOS image configured at block 508 may be executable by the networking device 410 the networking device 410 in the DC-MHS computing device 206a/400 as a BIOS microservice to provide a BIOS that is configured to perform any of the BIOS functions defined by the networking device DC-SCM functionality configuration. Similarly, one of skill in the art in possession of the present disclosure will appreciate how any BMC image configured at block 508 may be executable by the networking device 410 the networking device 410 in the DC-MHS computing device 206a/400 as a BMC microservice to provide a BMC that is configured to perform any of the BMC functions defined by the networking device DC-SCM functionality configuration. As such, one of skill in the art in possession of the present disclosure will appreciate how any DC-SCM functionality image configured at block 508 may be executable by the networking device 410 the networking device 410 in the DC-MHS computing device 206a/400 as a DC-SCM microservice that is configured to perform any of the DC-SCM functions defined by the networking device DC-SCM functionality configuration.

Figure 11A:
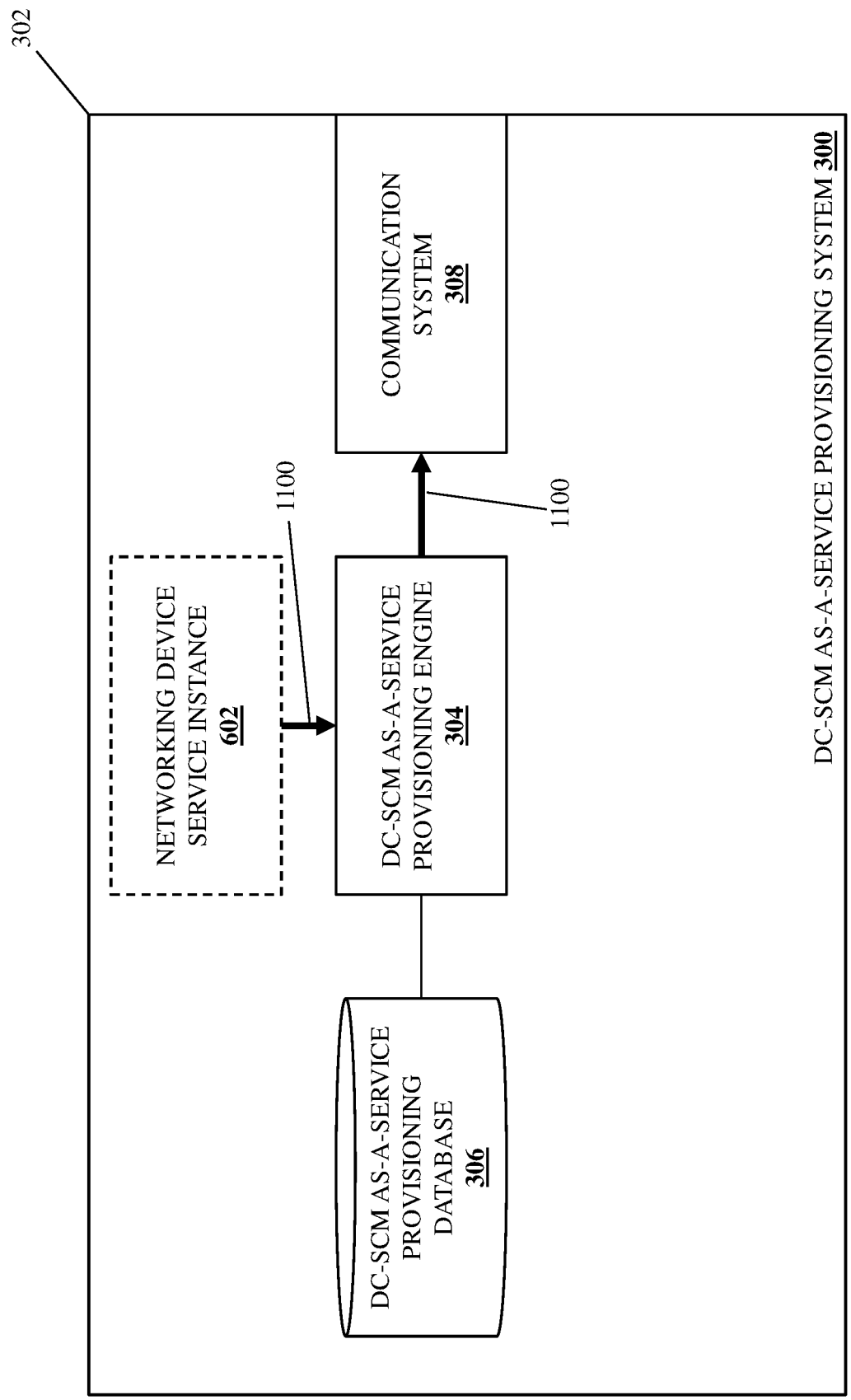
FIG. 11A is a schematic view illustrating an embodiment of the DC-SCM as-a-service provisioning system of FIG. 3 operating during the method of FIG. 5.
Figure 11B:
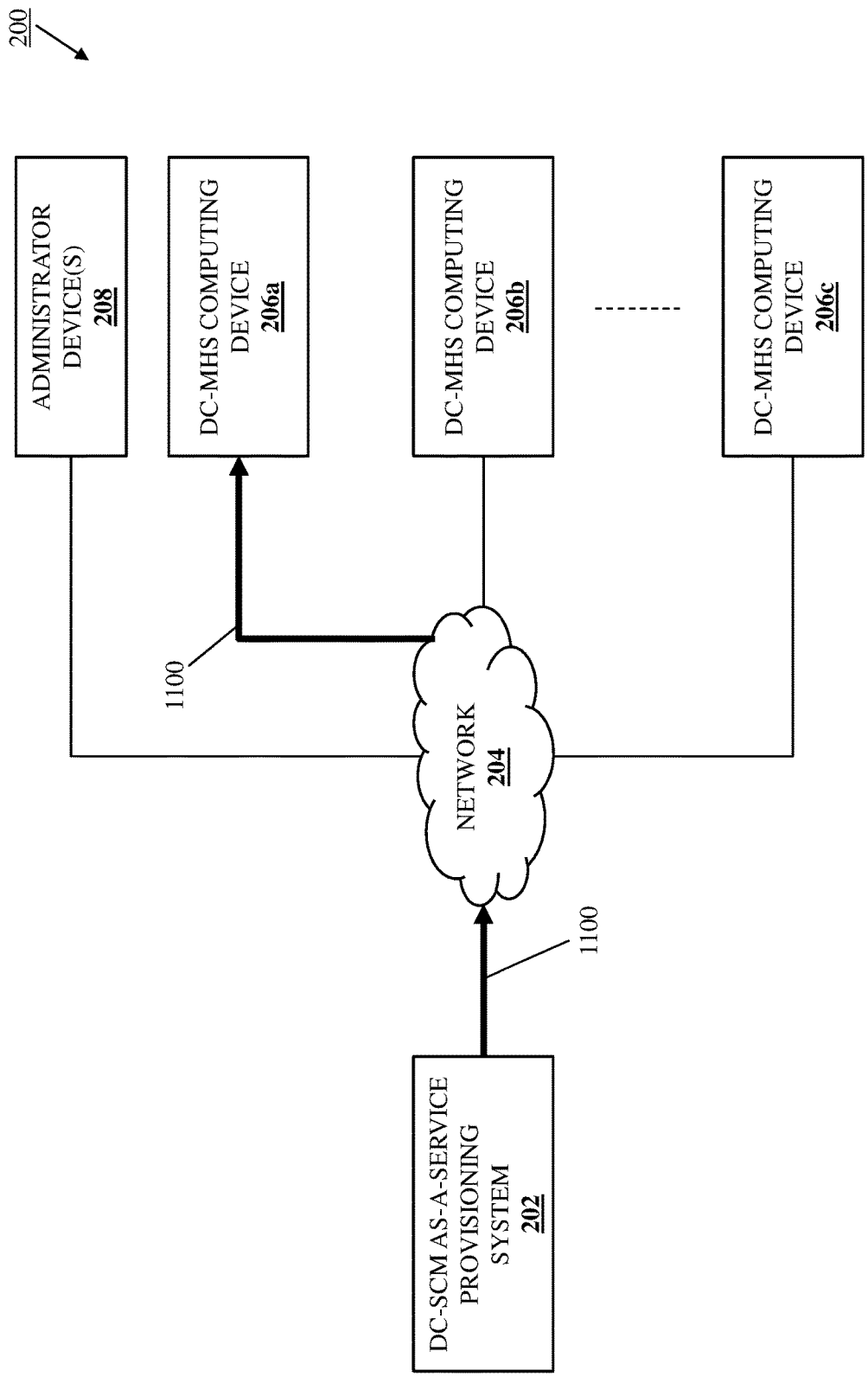
FIG. 11B is a schematic view illustrating an embodiment of the DC-SCM as-a-service system of FIG. 2 operating during the method of FIG. 5.
Figure 11C:
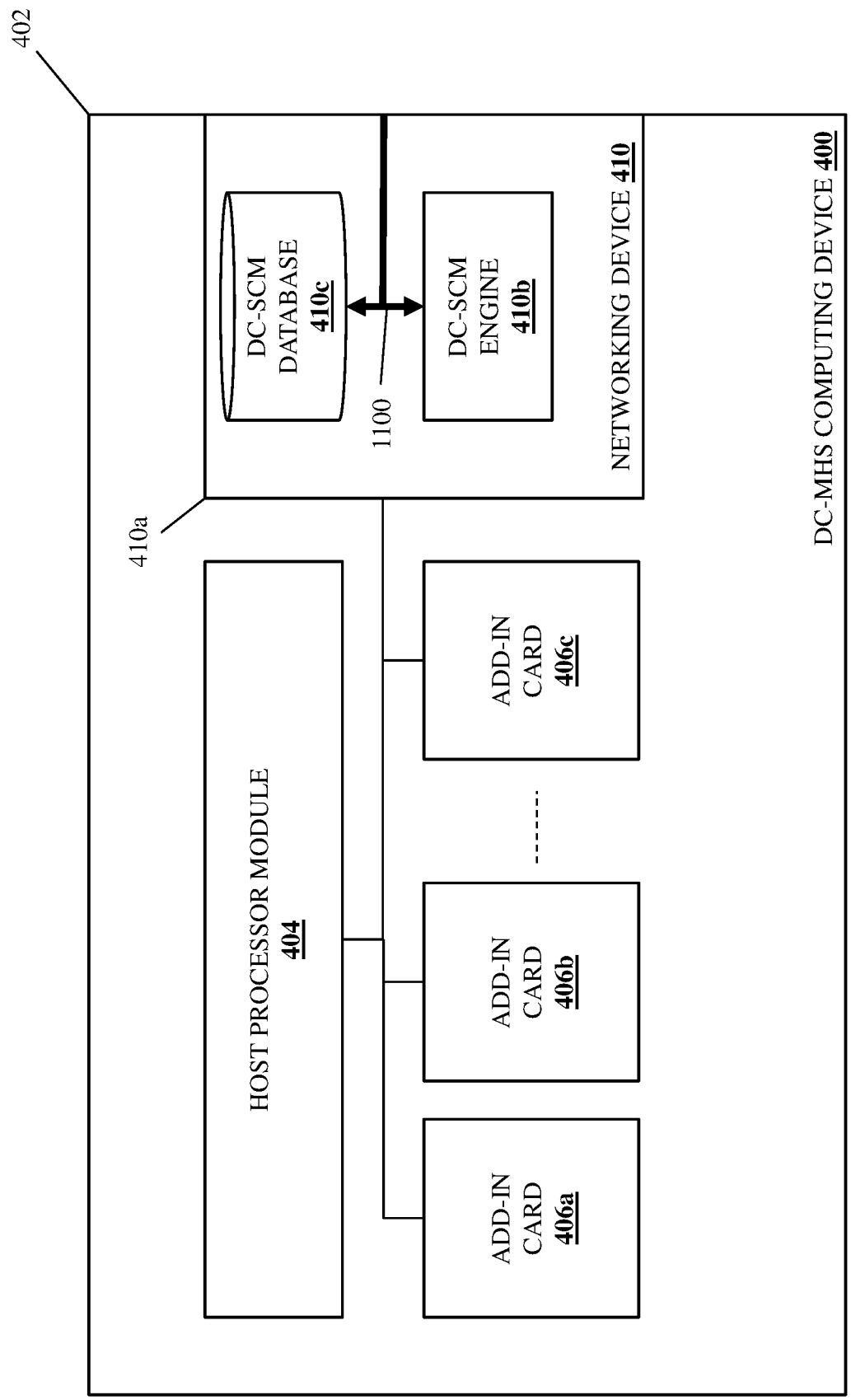
FIG. 11C is a schematic view illustrating an embodiment of the DC-MHS computing device of FIG. 4 operating during the method of FIG. 5.

The method 500 then proceeds to block 510 where the networking device receives at least one image from the DC-SCM as-a-service provisioning system. With reference to FIGS. 11A, 11B, and 11C, in an embodiment of block 510, the DC-SCM as-a-service provisioning engine 304 in the DC-SCM as-a-service provisioning system 202/300 may perform image provisioning operations 1100 that include the networking device service instance 602 transmitting the image(s)) that were provided on the networking device service instance 602 at block 508 through its communication system 310 and the network 204 for deployment on the networking device 410 in the DC-MHS computing device 206a/400 such that the networking device 410 in the DC-MHS computing device 206a/400 receives those image(s) as agent microservices that will run on the networking device 410.

As illustrated in FIG. 11C, in some embodiments, the image provisioning operations 1100 may include providing the image(s) in the DC-SCM database 410c in the networking device 410 of the DC-MHS computing device 206a/400 to configure the DC-SCM engine 410b to perform the networking device DC-SCM functionality (e.g., the BIOS functionality and/or BMC functionality described above) as agent microservices, which as discussed above may include any operations that one of skill in the art in possession of the present disclosure would recognize as providing the BIOS microservice and/or the BMC microservice (e.g., that were configured on the networking device service instance 602) described above on the networking device 410. However, while a specific example of the provisioning of images on a networking device has been described, one of skill in the art in possession of the present disclosure will appreciate how images may be provided on a networking device in a variety of manners that will fall within the scope of the present disclosure as well.

Figure 12:
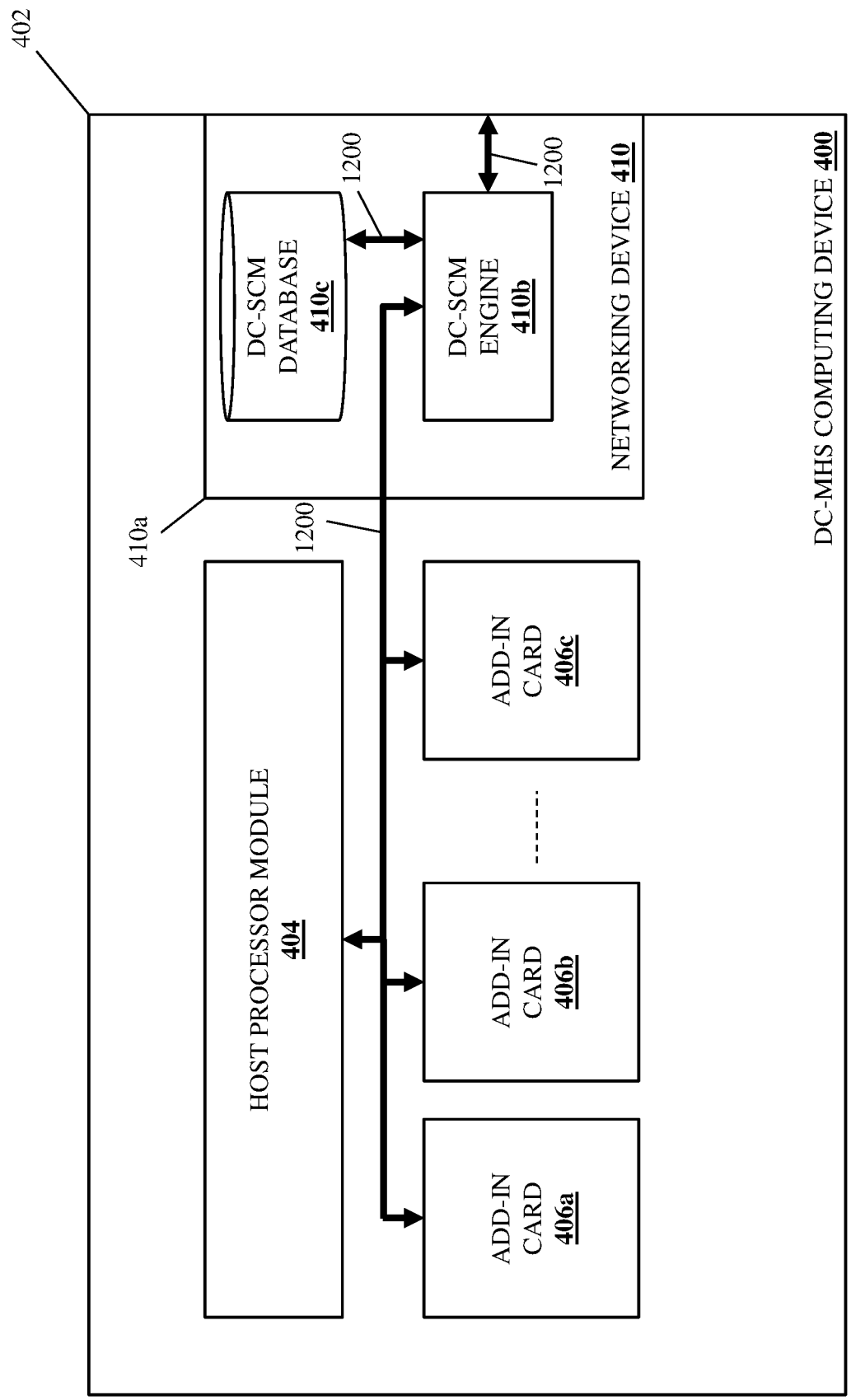
FIG. 12 is a schematic view illustrating an embodiment of the DC-MHS computing device of FIG. 4 operating during the method of FIG. 5.

The method 500 then proceeds to block 512 where the networking device executes the at least one image to perform networking device DC-SCM functionality. With reference to FIG. 12, in an embodiment of block 512, the DC-SCM engine 410b in the networking device 410 of the DC-MHS computing device 206a/400 may perform image execution operations 1200 that may include executing the image(s) stored in the DC-SCM database 210c in the networking device 410 of the DC-MHS computing device 206a/400 to perform networking device DC-SCM functionality with the HPM 404, any of the AICs 406a-406c, and/or via the network 204 connected to the networking device 410.

As such, continuing with the specific example provided above, the image execution operations 1200 by the DC-SCM engine 410b may include executing a BIOS image stored in the DC-SCM database 410c to provide a BIOS microservice that performs any of a variety of BIOS initialization and/or runtime operations enabled by that BIOS image for the DC-MHS computing device 206*a*/400 and/or with the HPM 404, any of the AICs 406*a*-406*c*, and/or via the network 204. Similarly, continuing with the specific example provided above, the image execution operations 1200 by the DC-SCM engine 410*b* may include executing a BMC image stored in the DC-SCM database 410*c* to provide a BMC microservice that performs any of a variety of BMC management, security, and/or control operations enabled by that BMC image for the DC-MHS computing device 206*a*/ 400 and/or with the HPM 404, any of the AICs 406*a*-406*c*, and/or via the network 204. However, while specific networking device DC-SCM functionality has been described, one of skill in the art in possession of the present disclosure will appreciate how the image(s) may be executed at block 512 to perform any of a variety of DC-SCM operations while remaining within the scope of the present disclosure as well.

Thus, systems and methods have been described that provide for the configuration of a networking device in a computing device to perform DC-SCM functionality. For example, the DC-SCM as-a-service system of the present disclosure may include a DataCenter Modular Hardware System (DC-MHS) computing device having a Host Processor Module (HPM) and a networking device that is coupled to the HPM and a network, and a DC-SCM provisioning system that is coupled to the networking device via the network. The DC-SCM provisioning system provides a networking device service instance for the networking device, receives a networking device DC-SCM functionality configuration for the networking device through the network via the networking device service instance, and configures at least one image to provide networking device DC-SCM functionality defined by the networking device DC-SCM functionality configuration. The networking device receives the at least one image via the network, and executes the at least one image to perform the networking device DC-SCM functionality with the HPM. As such, DC-MHS computing devices that require networking device functionality and a corresponding networking device may configure that networking device to perform DC-SCM functionality in order to allow the DC-SCM that would conventionally be required for that DC-MHS computing device to be omitted, reducing the cost and complexity of that DC-MHS computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A DataCenter Secure Control Module (DC-SCM) as-a-service system, comprising:
 a DataCenter Modular Hardware System (DC-MHS) computing device that includes a Host Processor Module (HPM) and a networking device that is coupled to the HPM and a network; and
 a DataCenter Secure Control Module (DC-SCM) provisioning system that is coupled to the networking device via the network, wherein the DC-SCM provisioning system is configured to:
  provide a networking device service instance for the networking device;
  receive, through the network via the networking device service instance, a networking device DC-SCM functionality configuration for the networking device; and
  configure at least one image to provide networking device DC-SCM functionality defined by the networking device DC-SCM functionality configuration, and
  wherein the networking device is configured to:
   receive, via the network, the at least one image; and
   execute the at least one image to perform the networking device DC-SCM functionality with the HPM.

2. The system of claim 1, wherein the DC-MHS computing device includes an Add-In Card (AIC), and wherein the networking device is configured to execute the at least one image to perform the networking device DC-SCM functionality with the AIC.

3. The system of claim 1, wherein the at least one image includes a Basic Input/Output System (BIOS) image, and wherein the networking device executes the BIOS image to perform networking device DC-SCM initialization functionality with the HPM.

4. The system of claim 1, wherein the at least one image includes a Baseboard Management Controller (BMC) image, and wherein the networking device executes the BMC image to perform networking device DC-SCM management functionality with the HPM.

5. The system of claim 1, wherein execution of the at least one image by the networking device provides at least one microservice in the networking device that performs the networking device DC-SCM functionality with the HPM.

6. The system of claim 1, wherein the networking device is a Smart Network Interface Controller (SmartNIC) device.

7. The system of claim 1, wherein the DC-SCM provisioning system is configured to:
 determine, via the network, networking device capabilities of the networking device;
 determine networking device DC-SCM functionality that is available from the networking device based on the networking device capabilities of the networking device;
 present, via the network to an administrator device, a networking device DC-SCM functionality configuration user interface for the networking device service instance that identifies the networking device DC-SCM functionality that is available from the networking device; and
 receive, through the network via the networking device DC-SCM functionality configuration user interface for the networking device service instance, the networking device DC-SCM functionality configuration for the networking device.

8. An Information Handling System (IHS), comprising:
 a chassis;
 a Host Processor Module (HPM) that is housed in the chassis; and
 a networking device that is housed in the chassis, that is coupled to the HPM, and that is coupled to a network, wherein the networking device includes:
  a networking device processing system that is coupled to the network; and
  a networking device memory system that is coupled to the networking device processing system and that includes instructions that, when executed by the networking device processing system, cause the networking device processing system to provide a DataCenter Secure Control Module (DC-SCM) engine that is configured to:
receive, from a DC-SCM provisioning system via the network, at least one image that is configured to provide networking device DC-SCM functionality; and
execute the at least one image to perform the networking device DC-SCM functionality with the HPM.

9. The IHS of claim 8, further comprising:
an Add-In Card (AIC) that is housed in the chassis and coupled to the networking device processing system, wherein the DC-SCM engine is configured to execute the at least one image to perform the networking device DC-SCM functionality with the AIC.

10. The IHS of claim 8, wherein the at least one image includes a Basic Input/Output System (BIOS) image, and wherein the DC-SCM engine executes the BIOS image to perform networking device DC-SCM initialization functionality with the HPM.

11. The IHS of claim 8, wherein the at least one image includes a Baseboard Management Controller (BMC) image, and wherein the DC-SCM engine executes the BMC image to perform networking device DC-SCM management functionality with the HPM.

12. The IHS of claim 8, wherein execution of the at least one image by the DC-SCM engine provides at least one microservice in the networking device that performs the networking device DC-SCM functionality with the HPM.

13. The IHS of claim 8, wherein the networking device is a Smart Network Interface Controller (SmartNIC) device.

14. A method for providing DataCenter Secure Control Module (DC-SCM) functionality as a service, comprising:
receiving, by a networking device in a DataCenter Modular Hardware System (DC-MHS) computing device from a DataCenter Secure Control Module (DC-SCM) provisioning system via a network, at least one image that is configured to provide networking device DC-SCM functionality; and
executing, by the networking device, the at least one image to perform the networking device DC-SCM functionality with a Host Processor Module (HPM) in the DC-MHS computing device.

15. The method of claim 14, further comprising:
executing, by the networking device, the at least one image to perform the networking device DC-SCM functionality with an Add-In Card (AIC) in the DC-MHS computing device.

16. The method of claim 14, wherein the at least one image includes a Basic Input/Output System (BIOS) image, and wherein the networking device executes the BIOS image to perform networking device DC-SCM initialization functionality with the HPM.

17. The method of claim 14, wherein the at least one image includes a Baseboard Management Controller (BMC) image, and wherein the networking device executes the BMC image to perform networking device DC-SCM management functionality with the HPM.

18. The method of claim 14, wherein execution of the at least one image by the networking device provides at least one microservice in the networking device that performs the networking device DC-SCM functionality with the HPM.

19. The method of claim 14, wherein the networking device is a Smart Network Interface Controller (SmartNIC) device.

20. The method of claim 14, further comprising:
providing, by the DC-SCM provisioning system, a networking device service instance for the networking device;
receiving, by the DC-SCM provisioning system through the network via the networking device service instance, a networking device DC-SCM functionality configuration for the networking device; and
configuring, by the DC-SCM provisioning system, at least one image to provide networking device DC-SCM functionality defined by the networking device DC-SCM functionality configuration.

* * * * *